United States Patent [19]

Haunhorst

[11] Patent Number: 5,464,042
[45] Date of Patent: Nov. 7, 1995

[54] QUICK CONNECT AIR-CONDITIONING COUPLING

[75] Inventor: Gregory A. Haunhorst, Perrysburg, Ohio

[73] Assignee: Aeroquip Corporation, Maumee, Ohio

[21] Appl. No.: 378,500

[22] Filed: Jan. 26, 1995

Related U.S. Application Data

[63] Continuation-in-part of Ser. No. 236,226, Apr. 29, 1994, abandoned.

[51] Int. Cl.$^6$ ............................................. F16L 29/04
[52] U.S. Cl. ................ 137/595; 137/614.03; 137/614.04; 251/332
[58] Field of Search ................................. 137/594, 595, 137/614.03, 614.04, 614.05; 251/332

[56] References Cited

U.S. PATENT DOCUMENTS

| | | | |
|---|---|---|---|
| 2,359,648 | 10/1944 | Jones | 137/594 |
| 2,628,850 | 2/1953 | Summerville | 137/595 X |
| 3,039,794 | 6/1962 | De Cenzo | 137/614.03 |
| 4,540,021 | 9/1985 | Rogers | 137/614.05 |
| 4,753,268 | 6/1988 | Palau | 137/595 |
| 4,852,611 | 8/1989 | Knerr et al. | 137/595 |
| 5,123,446 | 6/1992 | Haunhorst et al. | 137/614.05 |
| 5,215,122 | 6/1993 | Rogers et al. | 137/614.04 |
| 5,220,810 | 6/1993 | Keltner | 62/292 |
| 5,323,808 | 6/1994 | Shimizu | 137/594 |

OTHER PUBLICATIONS

Brochure of Nitto Kohki Co. Ltd. entitled "Coupler Guide Book", date of publication unknown. No translations of Coupler Guide Book are available.

*Primary Examiner*—Stephen M. Hepperle
*Attorney, Agent, or Firm*—Emch, Schaffer, Schaub & Porcello Co.

[57] ABSTRACT

A coupling for joining together opposing ends of a pressurized refrigerant flow line utilizes a quick connect feature and provides a metal-to-metal seal when connected. When disengaged, opposing ends of the fluid flow line are closed by valves, each of which includes a structure containing an axial passageway and an axially extending valve positioned therein. The valves are yieldingly urged to a closed position when disconnected. The first structure and valve are mounted in a housing having a quick connect feature for retaining the second structure and valve. When connected together, the first structure and valve is moved axially relative to the second structure and valve, while the second structure is maintained in an axially fixed position in the housing. The axially extending first valve engages the axially extending second valve moving it relative to its structure from a closed to an open position while at the same time moving relative to a cooperating sleeve from a closed to an open position. Movement of the first structure in an axial direction causes it to engage the second structure metal-to-metal sealing engagement. Cams actuated by a rotatable handle mounted on the housing effect movement of the first structure.

46 Claims, 12 Drawing Sheets

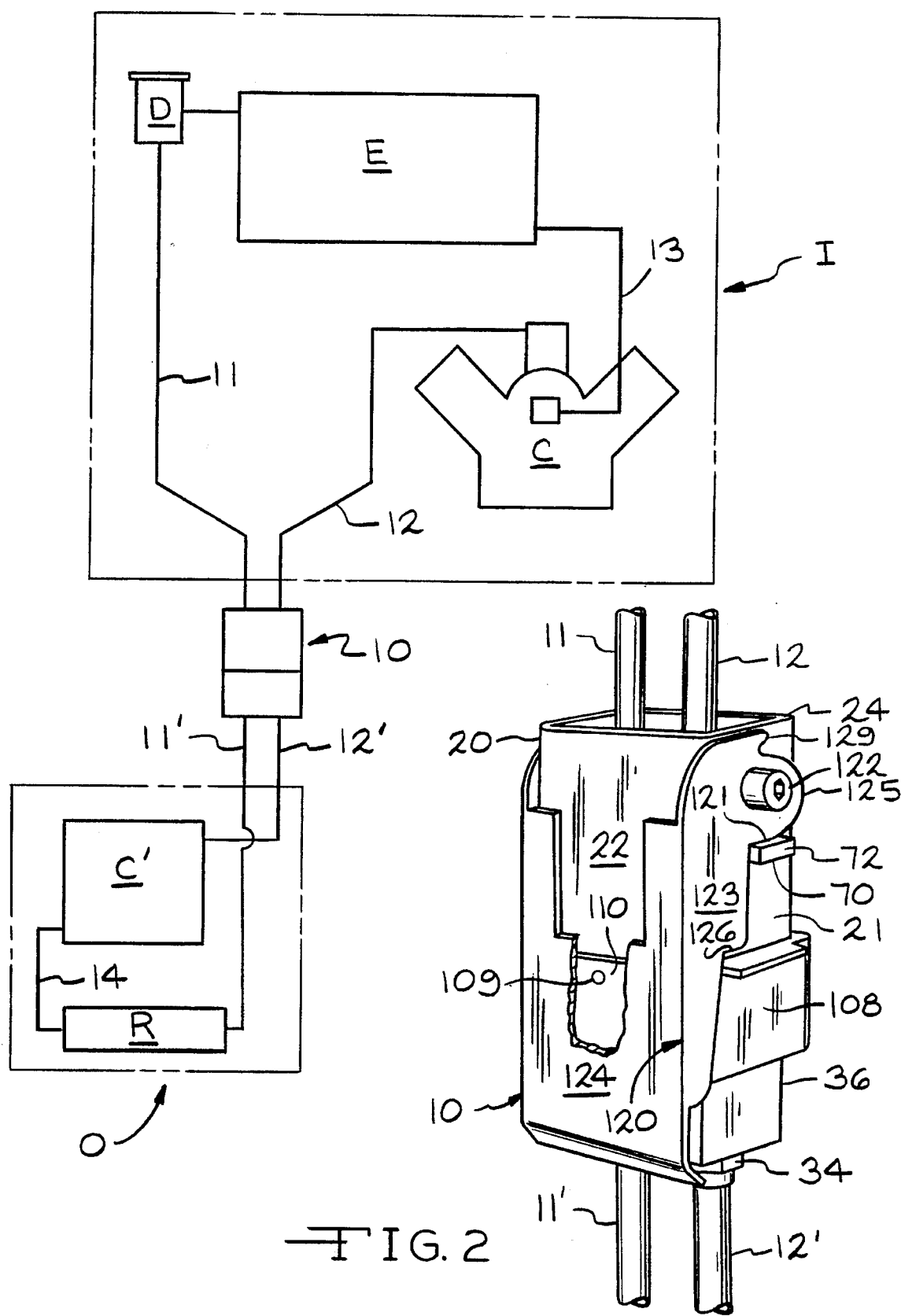

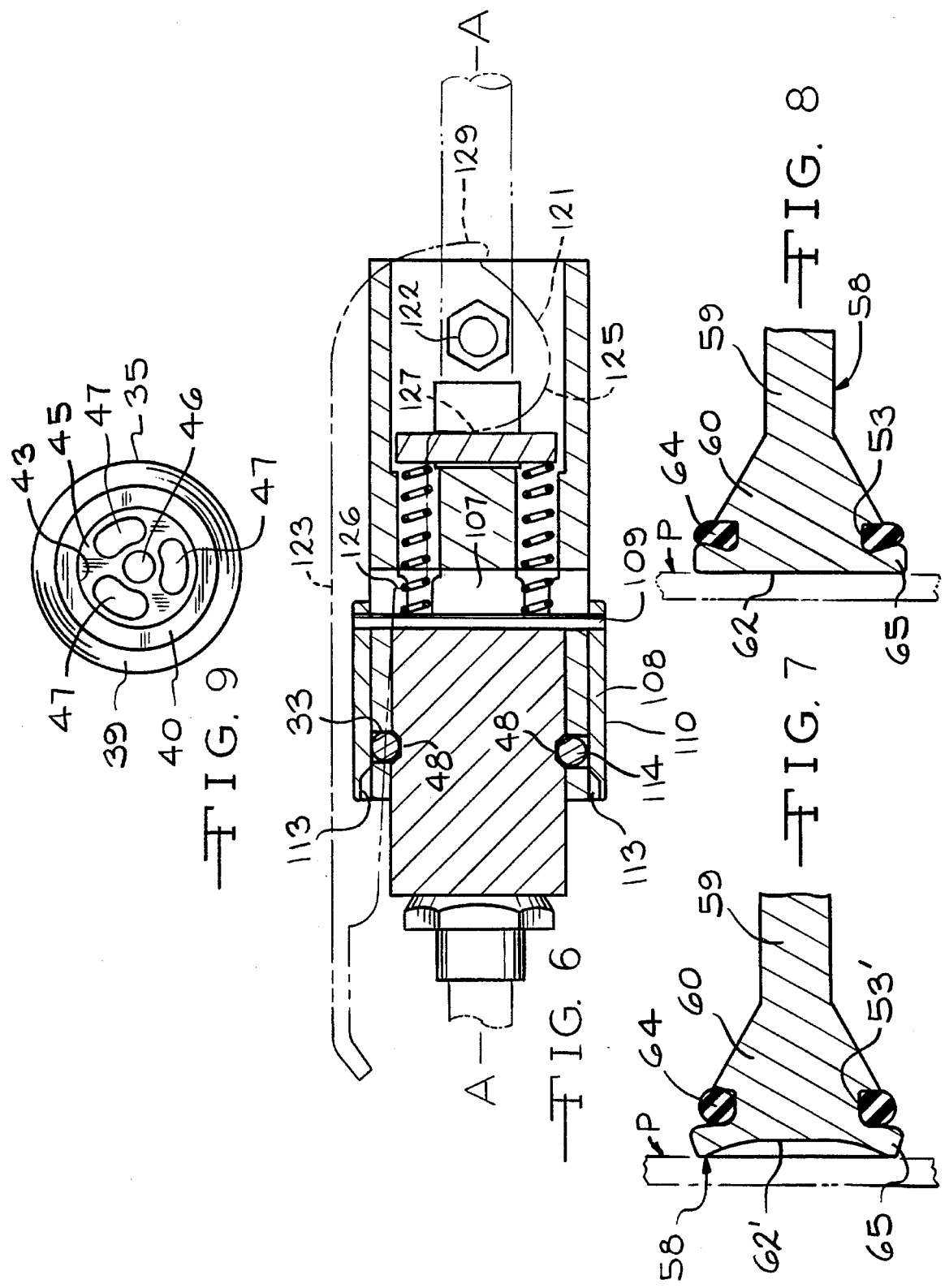

QUICK CONNECT AIR-CONDITIONING COUPLING

CROSS-REFERENCE TO RELATED APPLICATION

This application is a continuation-in-part of my co-pending U.S. application, Ser. No. 08/236,226 filed Apr. 29, 1994, now abandoned.

BACKGROUND ART

The present invention is directed to a refrigerant coupling which permits rapid connection of refrigerant lines under pressure without the use of tools with a minimum of refrigerant loss from or entry of air into the system during connection, operation or storage. It is particularly useful with portable split air-conditioning systems having an indoor unit with an evaporator coil and compressor and outside unit having a condensing coil. These types of units are particularly popular in Europe and Asia as the indoor unit, which is more expensive than the outside unit, may be moved from room to room thus permitting selective cooling of an apartment or house on a room by room basis thus avoiding the necessity of incurring the expense of central air-conditioning. One such system is sold under the name Argo by Filiberti S.p.A., Via Cadoma, 22-21044 Cavaria (VA) Italy.

Since the indoor unit of any such system may be frequently moved from room to room, it is desirable that it be used with a coupling designed to be rapidly and easily disconnected and reconnected to an outside unit and with a minimum of air entering the system and with a minimum of refrigerant loss from either unit during any such disconnecting and reconnecting operation even though the air-conditioning refrigerant in one or both such units may be at an elevated pressure at the time of such disconnecting or reconnecting operation. Furthermore, it is desirable that each connecting and disconnecting operation is able to be accomplished without the use of tools.

Accordingly, it is an object of the present invention to provide a quick connect refrigerant coupling capable of connecting portions of a refrigerant transport system which are maintained under pressure with a minimal loss of refrigerant or entry of air into the system and to do so without the necessity of using tools in making such connection or disconnection.

It is well known that air-conditioning refrigerants such as Freon 22 can penetrate and effuse through elastomeric seals. Accordingly, it is a further object of the present invention to provide a refrigerant coupling which may be rapidly connected as aforesaid and which is provided with a final seal which minimizes effusion of refrigerant. Under one embodiment a metal to metal seal is provided while under another embodiment an effusion resistant seal is provided.

In the portable units such as the Argo unit referenced heretofore, it is necessary to have two fluid flow lines, one of which directs compressed refrigerant in gaseous form from the compressor of the in-house unit to the condensing coil of the outside unit and the other of which directs refrigerant in liquid form from the outside unit to the inside unit. It is desirable to provide a single coupling which joins together opposing ends of both sets of fluid flow lines. Accordingly, it is a further object of the present invention to provide a quick connect refrigerant coupling housing two valves in parallel for connecting together opposing ends of two fluid flow lines in one operation and to do so without significant loss of either liquid or gaseous refrigerant or significant entry of air into the system.

When the in-house unit is disconnected from the outside unit, valves contained within the respective ends to be joined together will be closed and maintained in a sealed relationship to prevent escape of refrigerant. The valves will be under significant pressure, on the order of 125 psi to 200 psi depending upon the ambient temperature. When the opposing ends of the coupling are joined together, they become sealingly engaged to one another prior to opening the valves to the flow of refrigerant. Thereafter, the cams on the coupling are actuated to cause the valves to open thereby permitting the flow of the refrigerant through the lines.

Under one embodiment an elastomeric O-ring positioned in an annular groove of a valve stem having an enlarged head engages a tapered metal surface of a cooperating annular sleeve to seal the refrigerant in the line. When opposing ends of the lines are joined together the flow of the refrigerant through the lines under pressure has a tendency to cause the O-ring to blow out of the annular groove of the enlarged head of the stem valve. Under one embodiment of the present invention, the stem valve is provided with a design which permits an annular portion thereof to be deformed following positioning of the O-ring in the annular groove to thereby squeeze and lock the O-ring tightly in the annular groove thereby preventing the possibility of blow out of the O-ring upon opening of the valve to the refrigerant under pressure. Accordingly, it is another object of the present invention to provide a new method of forming a valve stem and a new design of valve stem which prevents unintended blow out of the O-ring from the annular groove.

Other objects and advantages of the present invention will be readily apparent from the detailed description of the invention.

Disclosure of the Invention

The present invention includes a housing containing dual flow passages, which housing may have readily connected thereto by means of a quick connect slidable release sleeve and pin and, under one embodiment, a male body member having a pair of valves or, under another embodiment, a pair of adapters each having a valve which is engaged to the valve of the female body member. Each of the valves has a flat mating face. The slideable sleeve operates in combination with a dowel pin positioned in a slot of the wall of the housing. A recessed area at the engagement end of the slidable sleeve releases the dowel pin to move outwardly upon retraction of the sleeve to thereby permit engagement of the male body member or the adapters to the housing. Upon release of the slidable sleeve to its forward, locking-position, the dowel pin is urged inwardly into engagement with a slot in the male body member or a recess in the adapters to retain the male body member or the adapters in the housing. The release sleeve is urged to its forward position by means of two spaced apart compression springs acting upon a pin extending laterally across the rear end of the sleeve.

The compression springs extend from the lateral pin to a plate mounted in the housing substantially perpendicular to the axis of the housing and moveable axially in slots formed in the housing from a retracted position at which the valves are closed to a forward position moving the valves to an open position. Following engagement of the male body member or adapters into the housing and retention therein by the dowel pins, the valves of the female body member and the male body member or the adapters are caused to open by means of axial movement imparted thereto by the plate which has connected thereto two valves of the female body member. A pair of cams of a rotatable handle assembly engage opposite ends of the plate and urge it toward the male body member or the adapters upon rotation of the handle. Such movement of the plate moves the female body members forward into sealing engagement with the male body member or the adapters and also moves valves contained in said male body member or in each of said adapters and female body members axially from closed positions to open positions thereby permitting the flow of refrigerant throughout both units of the air-conditioning system while maintaining an effective seal to prevent escape of refrigerant in any significant quantity.

DESCRIPTION OF THE DRAWINGS

FIG. 1 is a schematic view showing one possible flow path of refrigerant through a two-unit split air-conditioning system.

FIG. 2 is a perspective view of the refrigerant coupling of the present invention in an open position.

FIG. 6 is a view taken through line 6—6 of FIG. 5.

FIGS. 7 and 8 are fragmentary sectional views showing a portion of a valve stem of the valve mounted in the female body member before (FIG. 7) and after (FIG. 8) its deformation to lock an O-ring in a groove.

FIG. 9 is an end view of one of the female body members.

BEST MODE FOR CARRYING OUT INVENTION

Figure 3:
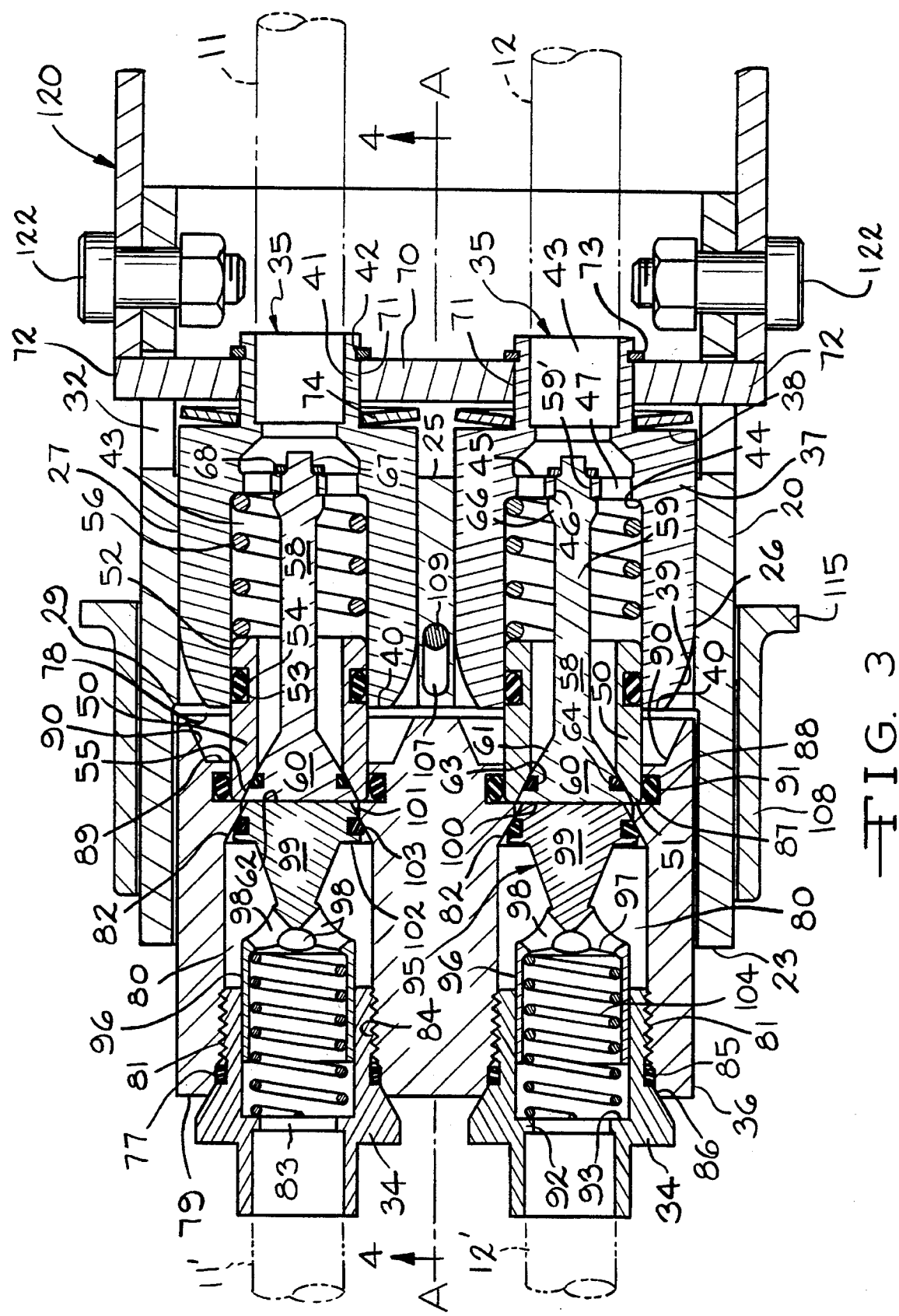
FIG. 3 is a sectional view showing the male body member engaged to the housing in which the female body members and their respective valves are mounted and showing such valves and the valves of the male body member in the closed position.

Referring now to FIGS. 1 and 2, there is provided a coupling generally designated by the numeral 10 which is designed to readily and easily connect one unit of a dual unit, split portable air-conditioner such as those previously described, for example, such as those sold under the trade name Argo. As shown schematically in FIG. 1, such air-conditioners include an indoor unit I and an outdoor unit O, each having a pair of fluid flow lines, lines 11 and 12 for the indoor unit I and 11' and 12' for the outdoor unit O. The lines 11, 11' and 12, 12', when connected by the coupling 10, direct the flow of fluid between the indoor unit I and the outdoor unit O. For example, as shown, the indoor unit includes an evaporator E which receives refrigerant in liquid form from an expansion device D. The liquid refrigerant flows from the outdoor unit O, through line 11 ', coupling 10 and line 11 to the expansion device D and the evaporator E. The evaporator E converts the liquid refrigerant to a gaseous state. A fluid line 13 directs the gaseous refrigerant from the evaporator E to a compressor C which pressurizes the gaseous refrigerant and directs it to the fluid line 12, through the coupling 10 and the fluid line 12' of the outdoor unit O and into a condenser C' of the outdoor unit O. The condenser C converts the refrigerant back to liquid and directs it through fluid line 14 to a receiver R which in turn directs it through fluid line 11 ', back through the coupling 10 and into the indoor unit fluid line 11. As previously discussed, since the indoor unit I may be frequently connected to and disconnect from the outdoor unit O, it is desirable that the coupling 10 permit rapid and easy operation without the need of tools.

Referring now to FIGS. 2–6, the coupling 10 includes a housing 20 having end walls 21 and side walls 22 cooperating to define a generally rectangular outer peripheral configuration. However, the end wall could be curved rather than planar. The housing 20 extends along an axis A from a first axial end 23 to a second axial end 24. Positioned approximately midway between the first axial end 23 and the second axial end 24 is a web 25 having a first enlarged cylindrical passageway 26 abutting one end wall 21 and both side walls 22 and a second enlarged cylindrical passageway 27 abutting the opposite end wall 21 and both side walls 22. Additionally, the housing is provided with two other passageways 28 which have a significantly smaller diameter than the first enlarged passageway 26 and second enlarged passageway 27. The centers of the first enlarged cylindrical passageway 26 and second enlarged passageway 27 lie on a line passing through the axis A and the centers of the other passageways 28 lie on a line passing through the axis A substantially perpendicular to the line of the centers of the first and second enlarged passageways 26 and 27. Each end wall 21 is provided with a first aperture 31 at a distance slightly spaced from the second axial end 24. The apertures 31 have a circular cross-sectional configuration. Each of the end walls 21 also has a larger, rectangular-shaped second aperture 32 extending from the web 25 toward the second axial end 24. Each of the side walls 22 has an elongated slot 33 extending generally parallel to and slightly spaced from the first axial end 23. The slots 33 are tapered such that they are wider on the external sides than on the internal sides of the sidewalls 22.

Releaseably received in the housing 10 at the first axial end 23 is a male body member 36 having a pair of adapters 34, one of which has secured thereto fluid flow line 11' and the other of which has secured thereto fluid flow line 12'. Permanently received in the housing 10 at the second axial end 24 is a pair of female body members 35.

The female body members 35 are positioned in side by side relationship. Each female body member includes a cylindrical wall portion 37 extending from a rearward end 38 to an inwardly arcing nose portion 39 which terminates at a flat leading end 40. The nose 39 and adjacent portion of each female body member 35 is received within one of the first and second enlarged cylindrical passageways 26 and 27. Extending in an axial direction from the rearward end 38 is a reduced diameter cylindrical wall 41 having an outwardly facing annular groove 42. The rearward end 38 of each cylindrical wall portion 37 is substantially flat and defines an annular shoulder.

Each female body member 35 has a central passageway 43 extending completely therethrough from the leading end 40 to the open end of the cylindrical wall 41. Each cylindrical wall 41 has connected thereto one of the fluid flow lines 11 or 12. An inwardly extending annular shoulder 44 is positioned in each central passageway 43 slightly spaced from the rearward end 38 toward the leading end 40. Extending laterally across the passageway from the annular shoulder 44 is a web 45 having a central aperture 46 and three arcuate-shaped apertures 47 generally encircling the central aperture 46. (See FIG. 9).

Positioned within the leading end 40 of the central passageway 43 of each female body member is a cylindrical sleeve 50 having a first end 51 extending out of the leading end 40 and a second end 52 positioned in the central passageway 43. Each cylindrical sleeve 50 has an outwardly facing annular groove 53 in which is positioned an elastomeric O-ring 54 sealingly engaged to the internal wall defining the central passageway 43 in the area near the leading end 40. Each cylindrical sleeve 50 has an internal wall with an outwardly flaring taper 55 at the first end 51. A compression spring 56 is positioned in each central passageway 43 with one end abutting the annular shoulder 44 and the other end abutting the second end 52 of the cylindrical sleeve 50.

A stem valve 58 is mounted in each female body 35. The stem valve 58 has an elongated shaft 59 extending from an enlarged head 60 at one end to a shaft extension 59' and a stub shaft 67 extending beyond the web 45. The enlarged head has an outwardly flaring tapered wall 61 terminating in a juncture with a flat face 62. An outwardly facing annular groove 63 is formed in the outwardly flaring wall 61 slightly spaced from the flat face 62. An elastomeric O-ring 64 is crimped for positive sealing engagement in the annular groove 63 in a manner to be hereinafter described.

The end of each stem valve 58 opposite the head 60 has a shoulder 66 abutting the web 45. A shaft extension 59' extends in an axial direction from the shoulder 66 and through the central aperture 46. A short stub shaft 67 extends from the shaft extension 59' beyond the web 45. A retaining ring 68 engages the stub shaft 67 adjacent the web 45.

As can be readily seen from the drawings, each compression spring 56 yieldingly urges the cylindrical sleeve 50 toward the flat face end 62 of the enlarged head of each stem valve 58 so that the inwardly facing tapered wall 55 engages the tapered wall 61 of the enlarged head 60 which is tapered at substantially the same angle as the inwardly facing tapered wall 55. Such urging sealingly engages the inwardly facing tapered wall 55 to the O-ring 64 when the valve 58 is in a closed position. The shaft extension 59' has a slightly smaller diameter than the central aperture 46 thereby permitting the stem valve 58 to move angularly as needed to provide effective mating between the outwardly flaring tapered wall 61 and the inwardly facing tapered wall 55 of the cylindrical sleeve 50.

The female body members 35 are retained in the housing 20 by means of a plate 70 extending across the housing 20 substantially perpendicular to the axis A. The plate 70 has a pair of apertures 71 each of which receives the cylindrical wall 41 of one of the female body members 35 and a pair of outwardly extending tabs 72 which extend through the rectangular apertures 32 of the housing 20. Retaining rings 73 positioned in outwardly facing grooves 42 retain the cylindrical wall 41 of each female body members 35 to the plate 70. A pair of spring washers 74, such as Belleville washers, encircle the cylindrical walls 41 in a position between the shoulder at the rearward end 38 and the opposite side of the plate 70 from the retaining rings 73.

Each of the female body members 35 and stem valves 58 carried thereby are movable in one of the enlarged passageway 26 and 27 in a direction parallel to the axis A in response to movement of the plate 70 in an axial direction. Means for effecting such movement of the plate 70 will be described later.

The male body member 36 is sized to be easily positioned in and removed from the housing 20 at its first axial end 23 and has an outer cross-sectional configuration similar to but slightly smaller than the interior configuration of the housing 20 at the first axial end 23. It should be noted that interior wall portion of the housing 20 adjacent the first axial end 23 is recessed from the interior wall portion of the housing 20 toward the second axial end 24 with a shoulder 29 between the larger cross-sectional area defined by the recessed wall portion and smaller cross-sectional area in the remainder of the housing. The shoulder 29 serves to limit the extent to which the male body member 36 may be inserted in the housing 20.

When inserted in the housing 20, the male body member 36 extends from an inner end 78 adjacent the shoulder 29 to an outer end 79 which extends outwardly from the first axial end 23 of the housing 20. As may be seen in FIGS. 4 and 6, a groove 48 is formed in each of the opposing faces of the male body member 36 which, upon insertion, is adjacent with each of the side walls 22 of the housing 20. Each groove 48 is positioned in an area aligned with one of the slots 33. The male body member 36 is provided with two substantially identical passageways 80 each of which is aligned with the central passageway 43 of one of the female body members 35. Each of the passageways 80 has internal threads 81 in an area slightly spaced from the outer end 79.

As previously mentioned a pair of adapters 34 each having outwardly facing threads 84, are engaged to the male body member 36, with one adapter 34 threadedly engaged in one of the passageways 80 and the other adapter threadedly engaged in the other passageway 80. Each adapter 34 has a passageway 83 for receiving refrigerant from or directing refrigerant to one of the fluid flow lines 11' or 12'. Toward the outer end 79 from the outwardly facing threads 84 is an annular groove 85 and an outwardly flaring wall 86. If desired, an elastomeric O-ring 77 may be positioned in the annular groove 85 of each adapter 34. Such 0ring 77 sealingly engages the portion of the male body member 36 adjacent thereto. However, the O-ring can be omitted as it has been found that an effective seal can be obtained without it. The outwardly flaring wall 86 of each adapter 34 engages a correspondingly tapered wall portion of the male body member 36 at the outer end 79.

Each of the adapters 34 is provided with an inwardly directed annular flange 92 defining a shoulder 93 facing toward the female body members 35.

Each of the adapters 34 is provided with a poppet 95 which has a cylindrical sleeve 96 received within the passageway 83 of the adapter 34 in axially slideable engagement with the internal wall portion opposite the threads 84 at the end of the adapter 34 closest to the female body members 35. Extending from each cylindrical sleeve 96 in a direction toward such female body members 35 is a spider 97 having a plurality of three or more apertures 98. An enlarged head 99 tapers outwardly from the spider 97 and terminates in a flat face 100 which is maintained in abutting relationship with the flat face 62 of the stem valve 58. The head 99 includes an outwardly facing wall member 101 tapering outwardly at an angle from the flat face 100 and away from the stem valve 58. The taper of the outwardly facing wall section 101 matches the taper of the wall segment 82 defining the constricted portion of the passageway 80. An annular groove 102 is provided in the head 99 in which is positioned an elastomeric annular seal 103 which sealingly engages the tapered wall segment 82. The elastomeric annular seal 103 is crimped in the annular groove 102 to prevent blow-out. A compression spring 104 is positioned in the cylindrical sleeve 96 of each adapter 34 with one end abutting the shoulder 93 with the opposite end abutting the spider 97. The compression springs 104 act to yieldingly urge the poppets 95 to a position at which their annular seals 103 sealingly engage the respective inwardly tapering wall segments 82 of the male body member 36 when the valves are closed.

The area of the male body member 36 between the inwardly tapering wall segments 82 defining the constricted portion of each of the passageways 80 and the inner end 78 includes a radial shoulder 87 sized to be engaged by the first end 51 of the cylindrical sleeve 50. An annular groove 88 retains an elastomeric O-ring 91 which sealingly engages the outer surface of each sleeve 50. A second shoulder 89 is between the annular groove 88 and the inner end 78. Extending from the outer portion of each second shoulder 89 is an outwardly tapering sealing wall 90 which follows a straight line path to the inner end 78. Each sealing wall 90 defines a section of a cone.

A quick connect feature for rapidly engaging the male body member 36 to the housing 20 includes a release sleeve 108 encircling the housing 20 and axially slideable thereon. A pin 109 is permanently engaged to the release sleeve 108, being affixed in opposing walls 110 adjacent the side walls 22 of the housing 20. The pin 109 extends through an elongated slot 107 in the web 45 of the housing 20. Each of the housing side walls 22 is provided with an elongated aperture 111 extending in a direction parallel to the axis A. The pin 109 also extends through each of the elongated apertures 111 which apertures along with the elongated slot 107 serve to limit the extent of axial movement of the release sleeve 108 on the housing 20.

Figure 4:
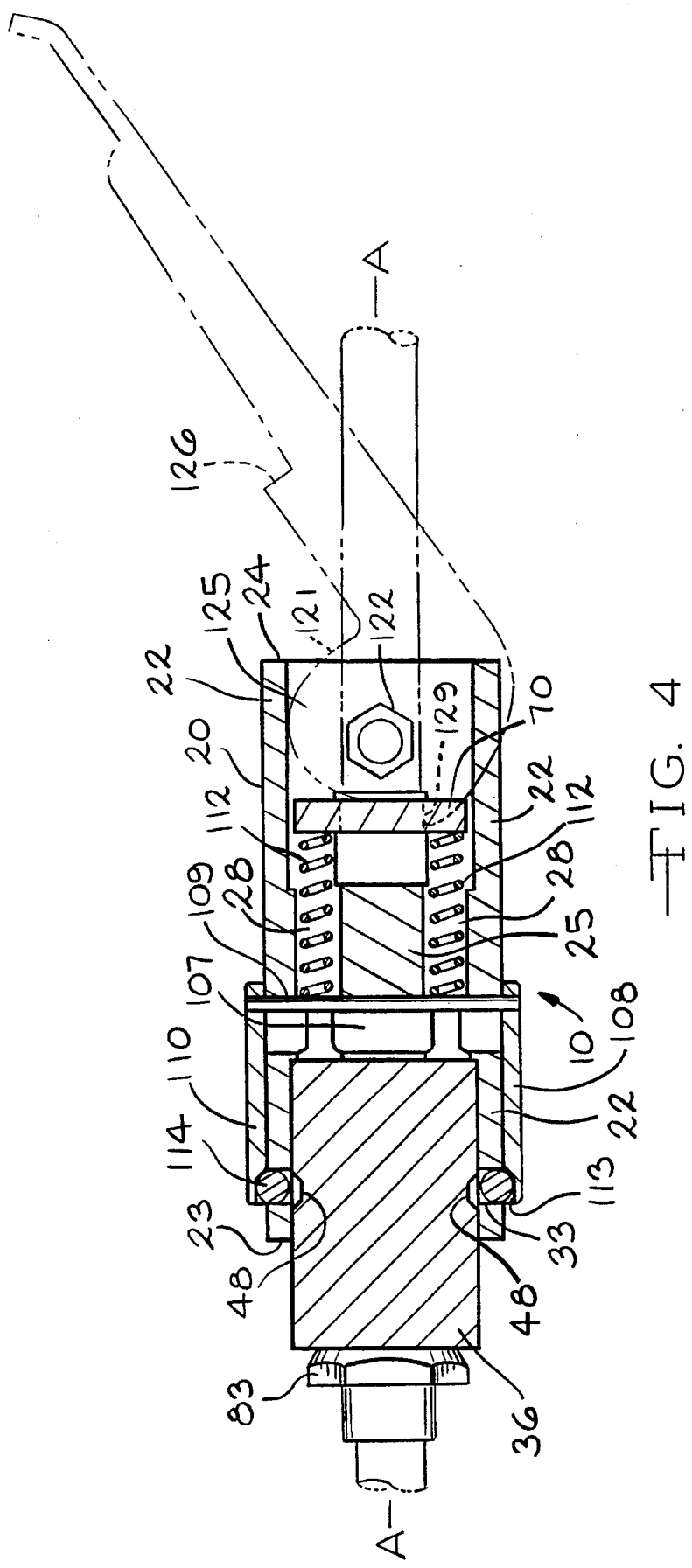
FIG. 4 is a sectional view taken through line 4—4 of FIG. 3.

With reference to FIGS. 4 and 6, two compression springs 112 are positioned in the housing 20, with one compression spring 112 positioned in each of the other passageways 28. One end of each of the compression springs 112 rests against the pin 109 and the other end of each compression spring 112 rests against the plate 70 thereby continuously urging the release sleeve 108 to a latched position while simultaneously urging the plate 70 into contact with cams 121 of a handle assembly 120. The release sleeve 108 has an inwardly facing recesses 113 at the end opposite the end to which the pin 109 is joined. The male body member 36 is provided with two outwardly facing grooves 48, each of which is aligned with one of the slots 33 formed in each side wall 22 of the housing 20. A dowel pin 114 is positioned in each of the slots 33 and is moveable therein toward and away from the axis A. The diameter of the dowel pin 114 is less than the width of the slot 33 at the external side but greater than the width at the internal side so that dowel pin 114 will not fall out when the male member is removed. The release sleeve 108 is provided with outwardly extending flanges 115 to facilitate manual gripping and retraction of the sleeve 108. When the release sleeve 108 is moved to its retracted position shown in FIG. 4, the inwardly facing recess 113 of the release sleeve 108 is aligned with each of the slots 33 thereby permitting each of the dowel pins 114 to move to its outermost position away from the axis A so that the innermost portion of the dowel pins 114 is aligned with or outwardly from the inner face of the housing side wall 22 thereby permitting the male body member 36 to be inserted into the housing 20. The diameter of the dowel pin 114 is greater than the thickness of the side wall 22. As a result, upon release of the sleeve 108 following engagement of the male body member 36 in the housing 20, the release sleeve 108 will move toward the male body member 36 in response to urging by the compression springs 112 to force the dowel pins 114 into engagement with the outwardly facing grooves 48 of the male body member 36 thereby locking the male body member 36 to the housing 20 with the flat face 100 snugly engaged against the flat face 62 of the stem valve 58.

As can be readily appreciated, each of the valves carried by the respective female body members 35 and male body member 36 remains in a closed position when the male body member 36 is initially engaged to the housing 20 as shown in FIG. 3. Thus, each of the stem valves 58 of the female body members 35 have the O-rings 64 of the heads 60 sealingly engaged to the tapered wall portion 55 of its respective cylindrical sleeve 50. Similarly, the annular seals 103 of the enlarged heads 99 are sealingly engaged to the adjacent tapered wall segments 82 of the male body member 36. Thus, the male body member 36 may be readily and easily engaged to the housing 20 and into engagement with the flat face 62 of the stem valve 58 even though there may be significant pressure in the fluid flow lines 11, 11', 12, 12' connected to either the female body member 35 or the adapters 83 of the male body member 36.

Following engagement of the male body member 36 to the housing 20, the coupling 10 is now ready for opening the respective stem valves 58 contained in the female body members 35 and poppet valves 95 in the male body member 36. Such opening is accomplished by means of a handle assembly 120. The handle assembly includes a pair of cams 121 each of which is engaged to the side of the plate 70 opposite the spring washers 74. The handle assembly 120 is pivotally mounted by means of bolts 122 fastened to the opposing end walls 21 of the housing 20 and extending through the apertures 31. Each of the cams 121 has an enlarged portion 125. Arms 123 extend from each of the cams 121 and are joined together in an area remote from the cams 121 by a laterally extending plate portion 124. A shoulder 126 is provided in each of the arms 123.

Figure 5:
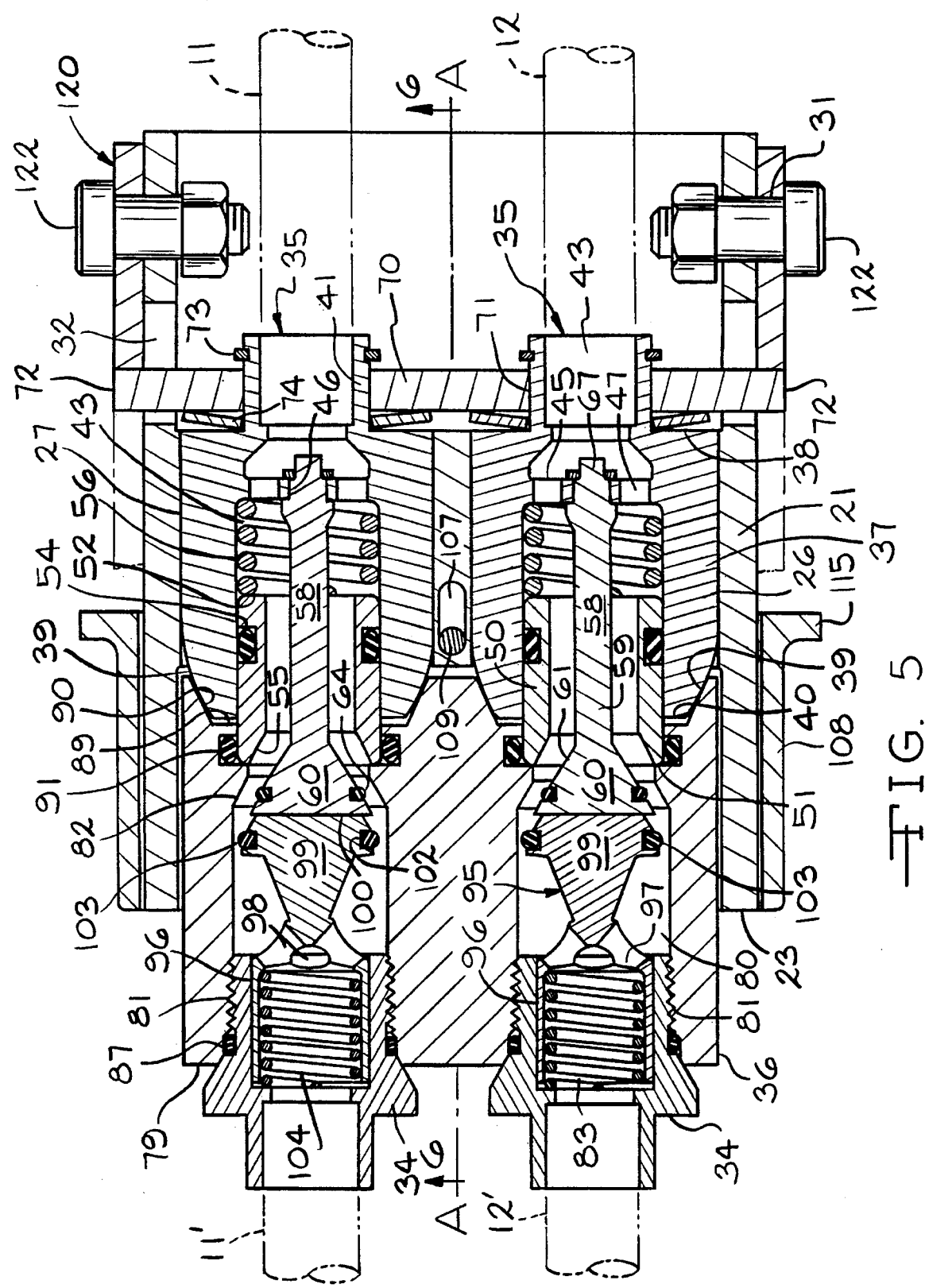
FIG. 5 is a view similar to FIG. 3 but showing the handle and cams rotated to open the valves to the flow of refrigerant and showing the male body member and female body members sealingly engaged.
Figure 10:
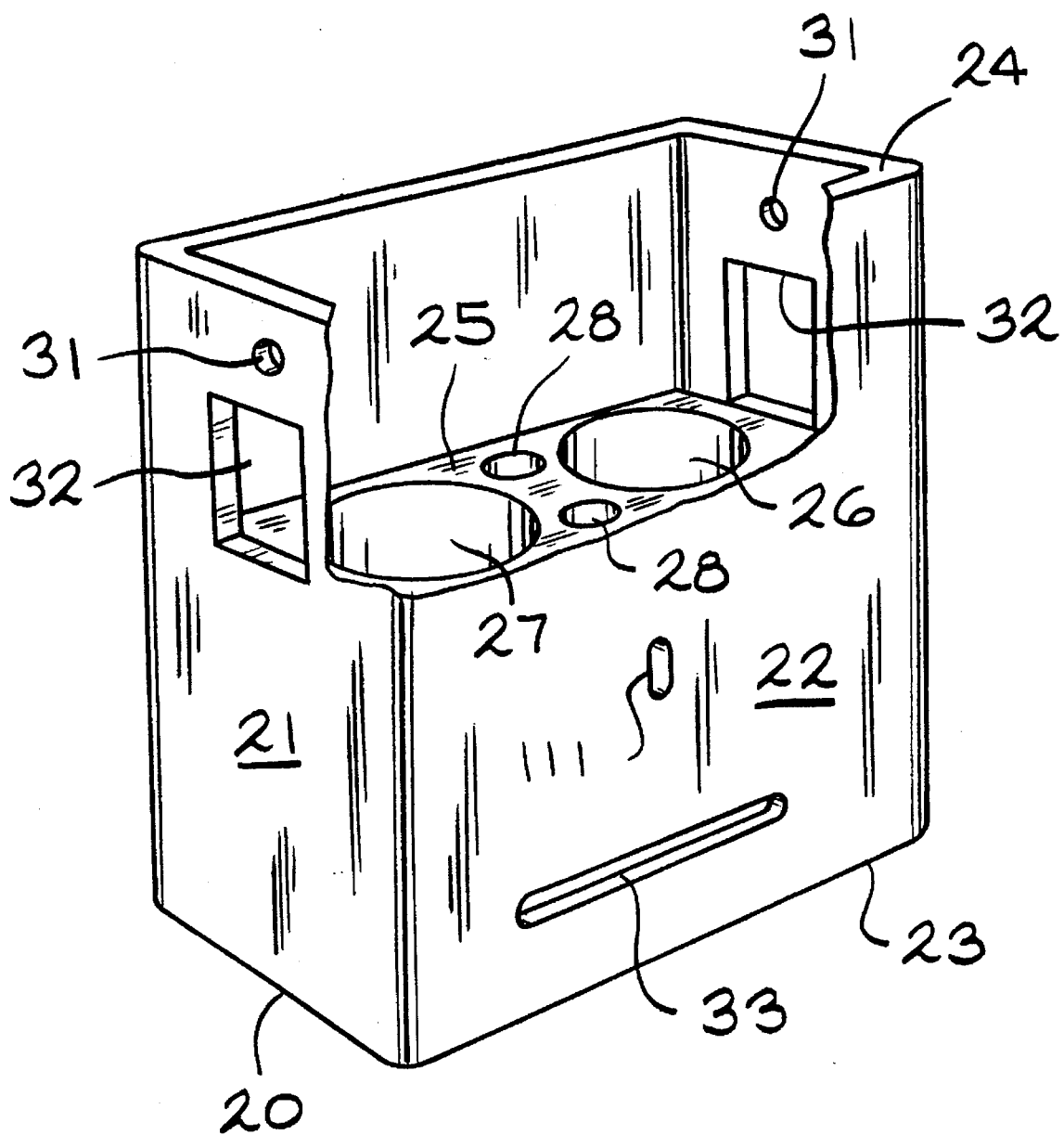
FIG. 10 is a perspective view, partly in section, of the housing.

The portions of the cams 121 between the enlarged portion 125 and the arms 123 are closer to the pivot defined by the bolts 122 than the enlarged portion 125 to provide an over-center action to cause the handle assembly 120, upon rotation to the position opening the valves as shown in FIGS. 2, 5 and 6 remain in that position. Each of the cams 121 is also provided with an outwardly extending shoulder 129 functioning as a stop which is engageable with the plate 70 when the handle assembly 120 is moved to the position of FIG. 4. Such engagement prevent the plate portion 124 from contacting the fluid flow lines 11 and 12.

With the male body member 36 engaged to the housing 20 with the release sleeve 108 locking the dowel pins 114 in the respective grooves 48 of the male body member 36, the handle assembly 120 is rotated about the pivot point defined by the bolt 122 from the position shown in FIGS. 3 and 4 to the position shown in FIGS. 5 and 6. As a result of such movement, the enlarged portion of the cam designated by the numeral 125 in FIG. 4 pushes against the plate 70, urging it against the yielding action of the compression springs 112 and spring washers 74 in an axial direction toward the male body member 36 and the valves contained therein. Such axial movement of the plate 70 urges the female body members 35 into to a position at which curved outer surface the nose 39 engages the outwardly tapering sealing wall 90 of the male body member 36 and the stem valve 58 against the poppet 95 thereby urging the poppet valve 95 against the yielding action of the compression spring 104 to a position such that the annular seal 103 becomes disengaged from the outwardly facing wall 82 allowing flow of refrigerant. Simultaneously with such movement, the end 51 of the sleeve 50 abuts the shoulder 87 thus preventing further axial movement of the sleeve 50 while the stem valve 58 continues its axial movement toward the first axial end 23 thereby releasing the O-ring 64 from its sealing engagement with the tapered wall 55 and opening the stem valve 58. Upon completion of such opening, the nose 39 with its curved surface becomes sealingly engaged in a metal-to-metal seal with the tapered sealing wall 90. The spring washers 74 compensate for tolerances in the manufacture of the various components and insure that a fluid tight, leak proof metal-to-metal seal is achieved. As will be readily seen, the stem valves 58 and the poppet valves 95 will begin to open upon movement of the cams 1 21 against the plate 70 and such initial opening will occur prior to the curved surface of the nose 39 contacting the tapered sealing wall 90. During the interval between such initial opening and completion of movement of the female body members 35 to a position at which the curved surfaces of their noses 39 make sealing engagement with the respective tapered sealing wall 90, the only seals preventing the loss of refrigerant are the engagement of O-rings 91 to the outer surfaces of the cylindrical sleeves 50.

The handle assembly 120 with its cams 1 21 acting on the plate 70 provide the mechanical advantage required to force all valves open against the pressure contained therein and also to provide the force needed to achieve a fluid-tight metal-to-metal seal.

As may be seen in FIG. 6, when handle assembly 120 is rotated to the open position, the shoulders 126 are positioned over opposite ends of the release sleeve 108 thereby locking the release sleeve 108 and preventing its inadvertent movement to a position at which the dowel pins 114 could move outwardly into the recessed areas and prematurely releasing the male body member 136 prior to closing the stem valve 158 and poppet valve 95.

Referring now to FIGS. 7 and 8, there is shown an enlarged fragmentary view of the head 60 and a portion of the axial shaft 59 of the stem valve 58. In view of the fact that the coupling of the present invention and the stem valves 58 are intended for use in a system maintained at very high pressures, pressures in excess of 125 psi, there is a risk that the O-ring 64 could be blown out of the annular groove 53 upon opening of the stem valve 58 resulting from axial movement thereof upon rotation of the cam 121 against the plate 70 causing disengagement of the O-ring 64 and adjoining tapered wall portion 61 from the matching tapered surface 55 of the cylindrical sleeve 50. Accordingly, it is desirable to provide means for firmly engaging the O-ring 64 in the annular groove 63. This is accomplished by forming the stem valve 58 as shown in FIG. 7 with only the central portion 62' of its end face flat and providing an annular ring extension 65 which tapers away from the shaft 59. The annular ring extension 65 has an enlarged thickness at its outer periphery and tapers to a thinner thickness at the base or bottom of the annular groove 53'. Thus, as viewed in cross section in FIG. 7, the forward side of the annular ring extension 65, i.e., that portion extending from the end face flat central portion 62' and opposite the groove 53' is disposed at an angle of 20°±5° with respect to the plane defined by such end face flat central portion 62'. The side of the annular ring extension 65 adjacent the groove 53' is formed such that the annular groove 53' as shown in FIG. 7, is at least as wide at the open end as at its closed end so that the O-ring 64 may be readily positioned therein such that it will contact the bottom of the groove 53'.

With the O-ring 64 thus positioned in the annular groove 53', the enlarged head is then urged against an enlarged plate P thereby deforming the annular ring extension 65 to the position shown in FIG. 8 with the result that the entire end face 62 is flat including that portion defined by the leading side of the annular ring extension 65. Such deformation of the annular ring extension 65 changes the shape of the groove from that shown as 53' in FIG. 7 to that shown as 53 in FIG. 8. As can be readily be seen in FIG. 8, the enlarged portion of such annular ring extension 65 has gripped and deformed the O-ring 64 firmly crimping it in the groove 53 to prevent blow out of the O-ring 64 upon opening of the stem valve 58 while leaving the end face 62 flat to minimize loss of refrigerant and to minimize the unwanted inclusion of air into the fluid flow lines during connection and disconnection.

Although the valve of the present invention has been specifically designed for split unit type air-conditioners with two parallel fluid flow lines being connected by the same coupling, the principle involved in opening valves to pressurized fluid flow lines and achieving a metal-to-metal seal with a coupling that minimizes loss of refrigerant could also be used to connect opposing ends of a single fluid flow line. Additionally, if desired, the housing and male body member could be enlarged to permit other lines such as an electrical power line and/or a condensate flow line to be connected.

Referring now to FIGS. 11–15, there is shown a modified embodiment of coupling which is designed to reduce the amount of air inclusion to which the air-conditioning system may be subjected upon joining the coupling halves together. Additionally, the present embodiment provides a keying feature designed to ensure that the refrigerant lines may not be reversed upon coupling. As with the embodiment of FIGS. 1–10, the present embodiment is also designed to provide an exceptionally reliable seal to eliminate or at least reduce to a minimum the possibility of leakage of refrigerant during and after joining of the coupling parts together and the opening of the flow paths therebetween.

In FIGS. 11–15, there is shown a coupling generally designated by the numeral 210. The coupling 210 includes a housing 220 which is generally similar to the housing 20 of the previous embodiment. As such, the housing 220 includes a pair of end walls 221 and side walls 222 cooperating to define a generally rectangular outer peripheral configuration. The housing 220 extends along an axis A from a first axial end 223 to a second axial end 224. Positioned approximately midway between the first axial end 223 and second axial end 224 is a web 225 having a first enlarged cylindrical passageway 226 abutting or spaced a short distance from one end wall 221 and both side walls 222 and a second enlarged cylindrical passageway 227 abutting or spaced a short distance from the opposite end wall 221 and both side walls 222. Additionally, the web 225 is provided with two other passageways 228, each of which is close to opposing ones of the sidewalls 222 and both of which are centrally positioned between the end walls 221 and have a significantly small diameter than the first enlarged passageways 226 and second enlarged passageway 227. (See FIG. 14). Each end wall 221 is provided with a first circular aperture 231 at a distance slightly spaced from the second axial end 224 and a larger, rectangular-shaped second aperture 232 extending from a position slightly spaced from the web 225 toward the second axial end 224. Additionally, one but not both of the end walls 221 is provided with a notch 229 extending from the first axial end 223, the purpose of which is to serve as part of a keying arrangement to ensure that, upon connection, the refrigerant lines are not reversed. Each of the side walls 222 has an elongated slot 233 (See FIG. 14) extending generally parallel to and slightly spaced from the first axial end 223. The slots 233 are tapered such that they are wider on the external sides than on the internal sides of the side walls 222.

Releaseably received in the housing 210 at the first axial end 223 are a pair of adapters 234, one of which has secured thereto fluid flow line 111' and the other of which has secured thereto fluid flow line 112'. Permanently received in the housing 21 0 at the second axial end 224 is a pair of female body members 235. The female body members 235 are positioned in side by side relationship. Each female body member 235 extends from a rearward flat end defining a shoulder 238 to a leading end 239. Extending in an axial direction from the shoulder 238 is a reduced diameter cylindrical wall 241 having an outwardly facing annular groove 242. Each female body member 235 has a central passageway 243 extending completely therethrough from the leading end 239 to the open end of the reduced diameter cylindrical wall 241. Each cylindrical wall 241 has connected thereto one of the fluid flow lines 111 or 112.

The portion of each female body member 235 from the annular shoulder 238 toward the leading end 239 has a cylindrical exterior wall portion 240 sized to be snugly but slidingly received, one each in the first enlarged passageway 226 and second enlarged passageway 227 of the web 225. Each of the female body members 235 has an externally larger diameter portion 209 extending from the cylindrical exterior wall portion 240. A radial flange 208 extends outwardly from the externally larger diameter portion 209 and is sized to be in sliding contact with adjacent portions of the inner surface of the housing 220.

Positioned within each central passageway 243 is a guide 207 on which is mounted a valve 258. Each valve 258 has an elongated shaft 259 extending from an enlarged head 260 at one end to a short stub shaft 267. The enlarged head 260 has an outwardly extending flange 261 and terminates in a flat face 262. The shaft 259 has an enlargement 269 spaced from the stub shaft 267.

Each guide 207 has a central aperture 246 sized to receive that portion of the elongated shaft 259 between the stub shaft 267 and the enlargement 269. Three arcuate-shaped apertures 247 generally encircle the central aperture 246. A retaining ring 268 engages each stub shaft 267 to secure the guide 207 to its respective valve stem 258.

The central passageway 243 of each female body member 235 is defined in part by an inwardly facing cylindrical wall portion 206 extending from the leading end 239 toward the shoulder 238. The passageway 243 is reduced in size at an inwardly extending shoulder 205. The assembly of the stem valve 258 and guide 207 is positioned in the central passageway 243 with the guide 207 abutting the shoulder 205. The guide 207 with the valve 258 attached thereto is retained in its respective female body member 235 by deforming the wall portion 240 inwardly to form an abutment 204. If desired, other means for affixing the guide 207 within the inwardly facing cylindrical wall portion 206 could be utilized. For example, the cylindrical exterior surface of the guide 207 and the inwardly facing cylindrical wall portion 206 could have mating threads formed therein.

Figure 11:
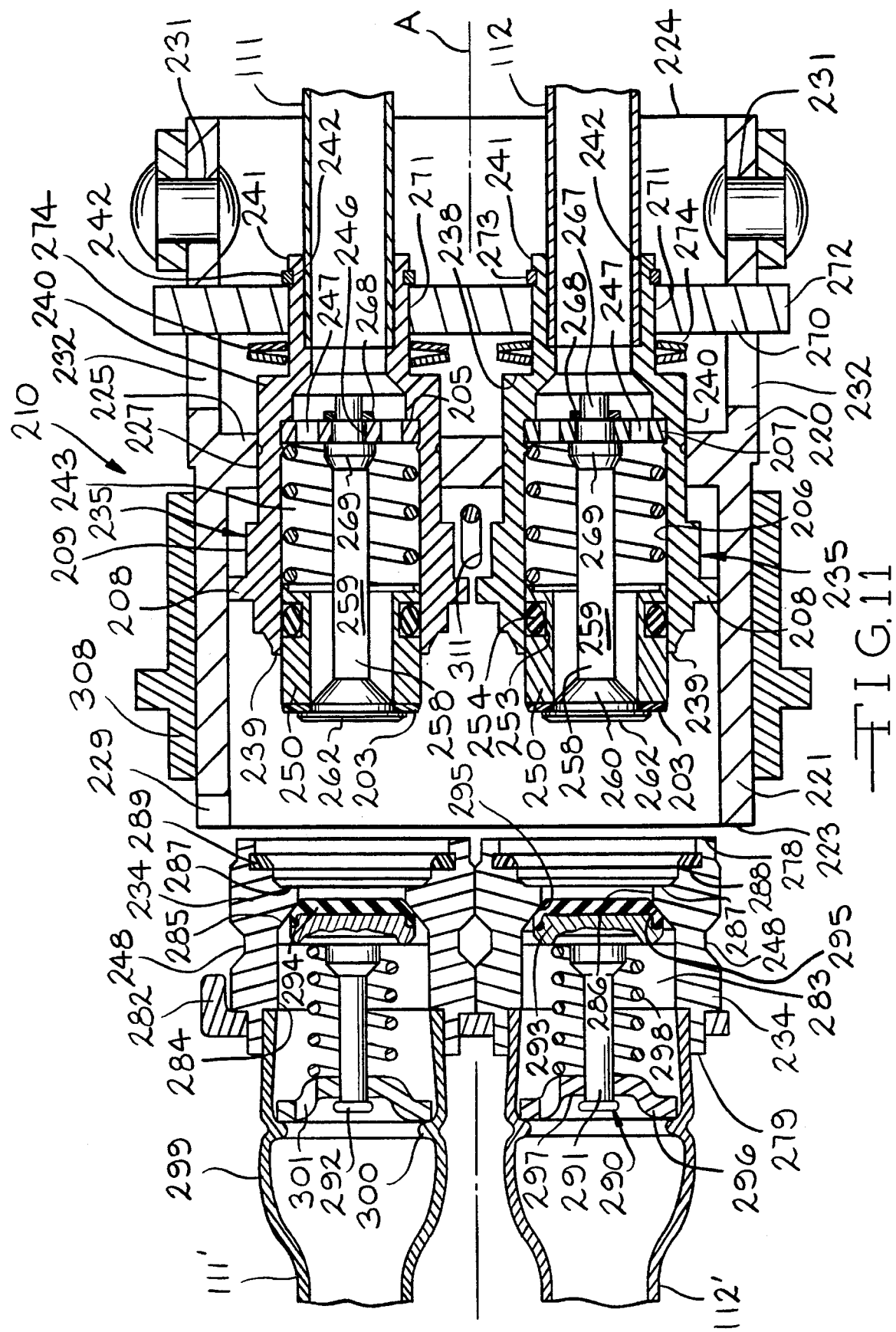
FIG. 11 is a sectional view of a modified embodiment in which a pair of adapters are mounted on a bracket for engagement with and disengagement from the housing and showing such adapters in a disengaged position.
Figure 12:
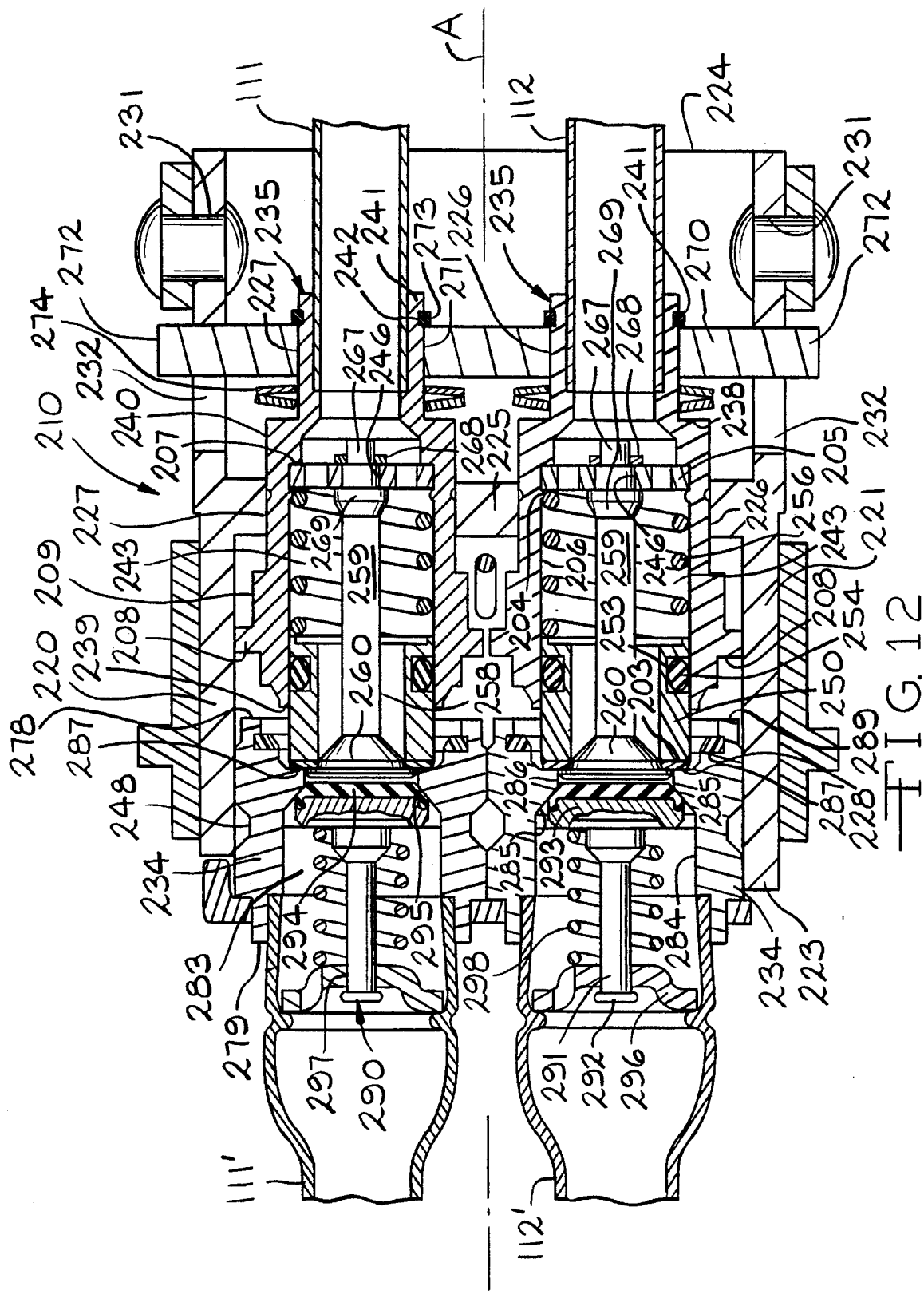
FIG. 12 is a view similar to FIG. 11 showing the pair of adapters and the bracket engaged to the housing but with all valves of the coupling in the closed position.

Each female body member 235 has a cylindrical sleeve 250 positioned therein for axial movement in sliding engagement with the inwardly facing cylindrical wall portion 206. Each sleeve 250 has an outwardly facing annular groove 253 in which is positioned an elastomeric O-ring 254 sealingly engaged to the inwardly facing cylindrical wall portion 206. A neoprene seal 203 is bonded to the leading end of the sleeve 250. A compression spring 256 encircles the elongated shaft 259 and abuts the trailing end of the sleeve 250 at one end and the guide 207 at the other end to thereby yieldingly urge the sleeve 250 away from the guide and into sealing engagement with the flange 261 of enlarged head 260 of the valve 258 as shown in FIGS. 11 and 12.

The female body members 235 are retained in the housing by means of a plate 270 extending across the housing 220 substantially perpendicular to the axis A. The plate has a pair of apertures 271 each of which receives the reduced diameter cylindrical wall 241 extending from the shoulder 238 of each female body member 235. The plate 270 also has a pair of outwardly extending tabs 272 which extend through the rectangular apertures 232 of the housing 220. Retaining rings 273 positioned in outwardly facing grooves 242 retain the cylindrical wall 241 of each female body 235 to the plate 270. A pair of spring washers 274, such as Belleville washers, encircle the cylindrical walls 241 in a position between the shoulder 238 and the opposite side of the plate 270 from the retaining rings 273.

Each of the female body members 235 and valves 258 carried thereby are moveable in one of the enlarged passageways 226 and 227 in a direction parallel to the axis A in response to movement of the plate 270 in an axial direction. The means for effecting such movement of the plate 270 is similar to that as in the previous embodiment.

Figure 16:
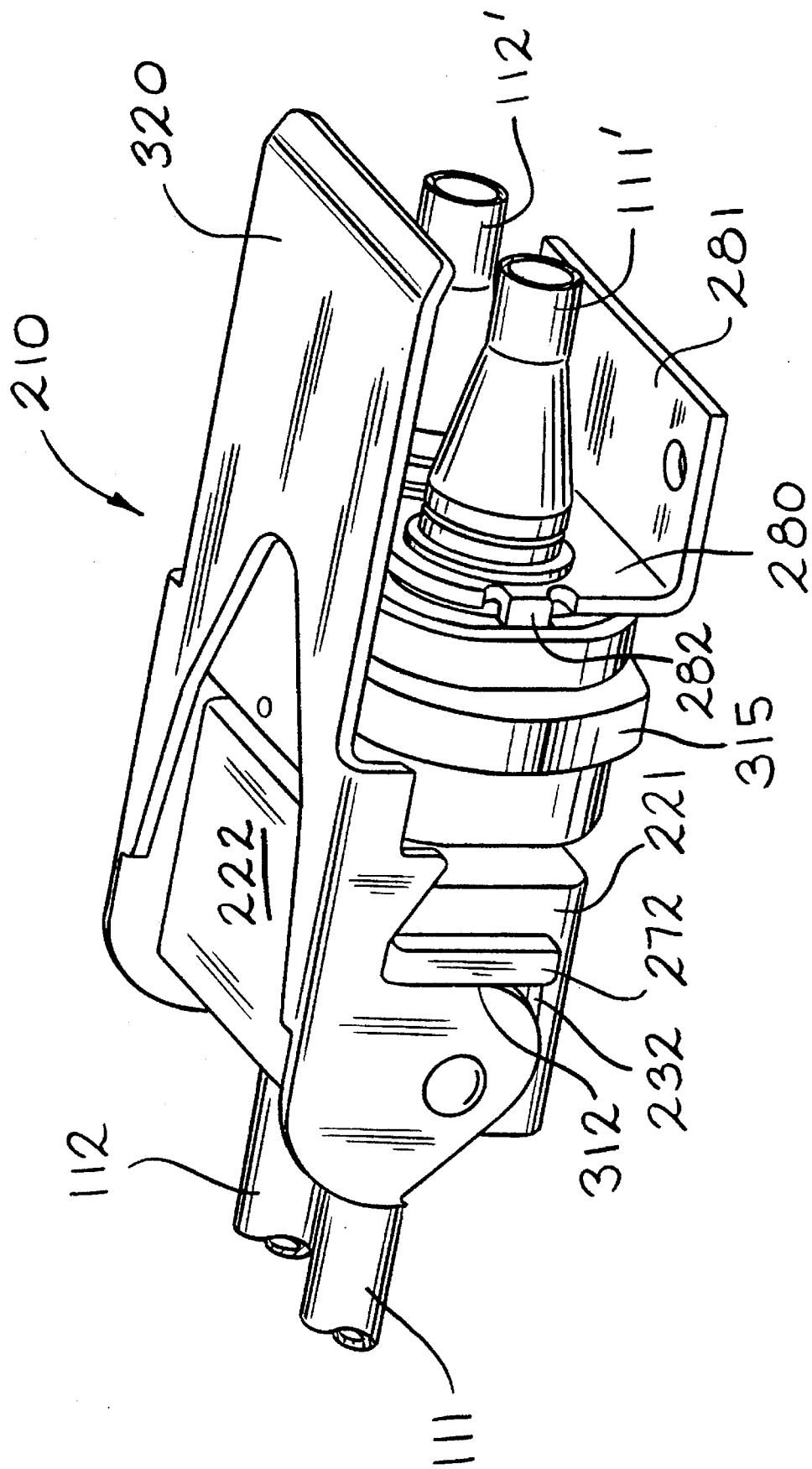
FIG. 16 is a perspective view of the coupling in the fully connected and open position.

The adapters 234 are mounted on a bracket 236 in order that they may be readily joined at the same time to the housing 220. As may be seen in FIGS. 15 and 16, the bracket 236 has a first planar portion 280 and a second planar portion 281 disposed at substantially right angles thereto. The first planar portion 280 has a pair of apertures, one to receive each of the adapters 234. A tab 282 extends from the first planar portion 280 and is sized to be received in the notch 229 of the housing 220. Since the bracket is provided with only a single tab 282 and the housing is provided with only a single notch 229, it is assured that the line 111' will be in communication with the line 111 and the line 112' will be in communication with the line 112 when the adapters are engaged to the housing 210.

Figure 13:
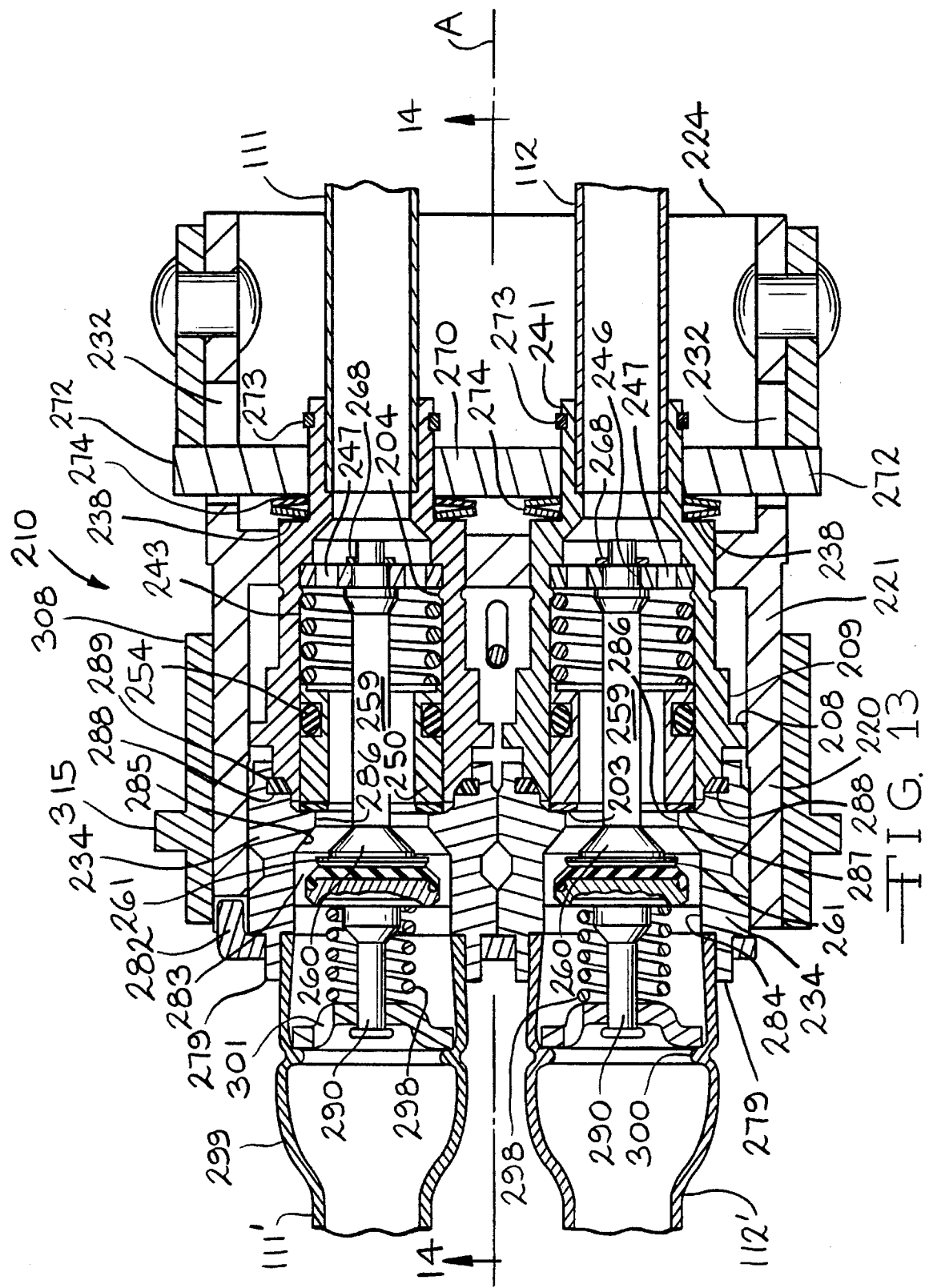
FIG. 13 is a view similar to FIG. 12 but showing the coupling with all valves in the fully open position.

The adapters 234 are sized to be easily positioned in and removed from the housing 220 at its first axial end 223. As joined to the bracket 236, the adapters define an outer cross-sectional configuration similar to but slightly smaller than the interior configuration of the housing 220 at the first axial end. As such, each adapter 234 extends from an inner end 278 to an outer end 279 which extends outwardly from the first axial end 223 of the housing 220 when the adapters are engaged thereto. Each of the adapters 234 has grooves 248 formed therein areas facing the side walls 222 of the housing 220. As shown in FIGS. 11-13, the grooves 248 may also be in areas of the adapter facing the end walls 221 of the housing. The grooves 248 facing the side walls 222 are positioned so as to be aligned with the elongated slots 233 when joined to the housing 220.

Each adapter 234 has a passageway 283 for receiving fluid from or directing fluid to one of the fluid flow lines 111' or 112'. The passageway 283 of each adapter 234 extends from the inner end 278 to the outer end 279 and is defined by an inwardly facing cylindrical wall portion 284 in the area of the outer end 279 and an inwardly tapering surface 285 in the vicinity of the inner end 278 which reduces the size of the passageway 283. A short cylindrical section 286 of reduced diameter joins the tapered portion 285 to a radially outwardly extending abutment 287. The abutment 287 is sized to be sealingly engaged with the seal 203 mounted on the end of the sleeve 250. A second radial abutment 288 of larger size than the abutment 287 is positioned axially outwardly from the abutment 287 and has adhered thereto an annular seal 289 positioned to engage the respective aligned female body member 235. As may be seen in FIG. 13, such engagement of the annular seal 289 with the aligned female body member 235 forms the primary seal between the female member 235 and the adapter when connected and fully opened. Accordingly, it is desirable that the annular seal 289 be formed of a material which is resistant to effusion of the refrigerant. For example, the seal 289 may be formed of nylon, Teflon, a soft copper alloy or other suitable material.

Each of the adapters 234 is provided with a stem valve 290 having an elongated shaft 291 with a major cylindrical portion having a slightly enlarged end 292 in the area of the outer end 279. An enlarged head 293 having a diameter larger than the diameter of the reduced cylindrical section 286 extends axially from the elongated cylindrical portion 291. A seal 294 formed of neoprene or other suitable sealing material is bonded to the enlarged head 293 and is sized to engage the end of the enlarged head 260 of the aligned female member 235 when the adapters 234 are fastened in the housing 220 and the cam is actuated to open the respective valves. The seal 294 has a tapered wall 295 positioned and sized to engage the tapered portion 285 when the stem valve 290 is in the closed position.

A spider 296 having a central aperture 297 receives the elongated cylindrical portion 291 of the stem valve 290. The slightly enlarged end 292 of the elongated cylindrical portion 291 is larger in size than the central aperture 297. A compression spring 298 is positioned between the spider 296 and the enlarged head 293 of stem valve 290 and functions to yieldingly urge the stem valve 290 into a closed sealed position with the tapered portion 295 of the flat seal 294 sealingly engaged to the tapered portion 285. Each adapter 234 is joined to its respective fluid flow line 111' or 112' by means of having an enlarged end portion 299 brazed or otherwise sealed to the outer end 279. The spider 296 is retained within such enlarged end 299 by means of the enlarged end 299 being crimped inwardly to form an inwardly extending flange 300 against which outer peripheral portions of the spider 296 rests. Each of the spiders 296 is provided with a plurality, preferably three, of flow openings 301 generally encircling the central aperture 297 through which the elongated cylindrical portion 291 extends.

A quick connect feature for rapidly engaging the adapters 234 and bracket 236 to the housing 220 includes a release sleeve 308 encircling the housing 220 and axially slideable thereon. A pin 309 is permanently engaged to the release sleeve 308 and is affixed to the opposing walls 210 adjacent the side walls 222 of the housing 220. Each of the housing side walls 222 is provided with an elongated aperture 311 extending in a direction parallel to the axis A. The pin 309 extends through each of the elongated apertures 311 which apertures serve to limit the extent of axial movement of the release sleeve 308 on the housing 220.

Figure 14:
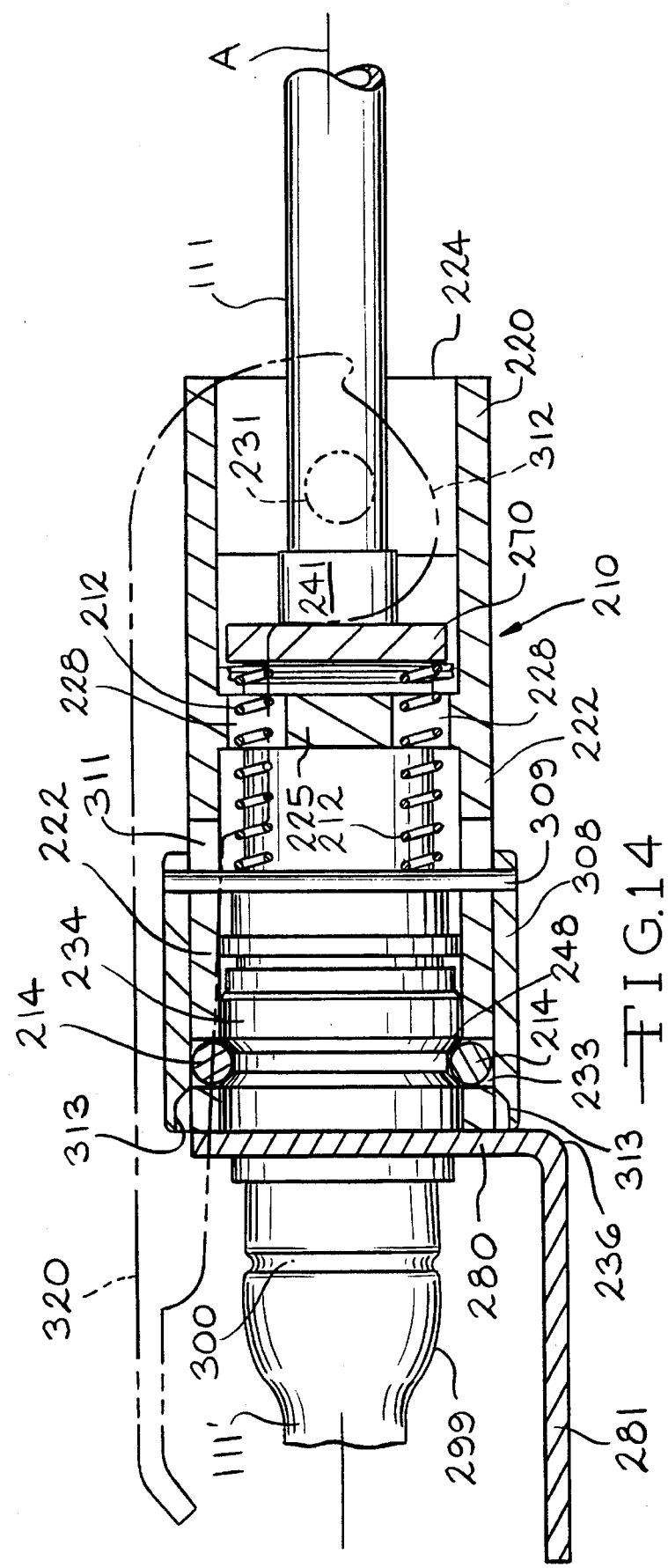
FIG. 14 is a view taken through line 14—14 of FIG. 13.
Figure 15:
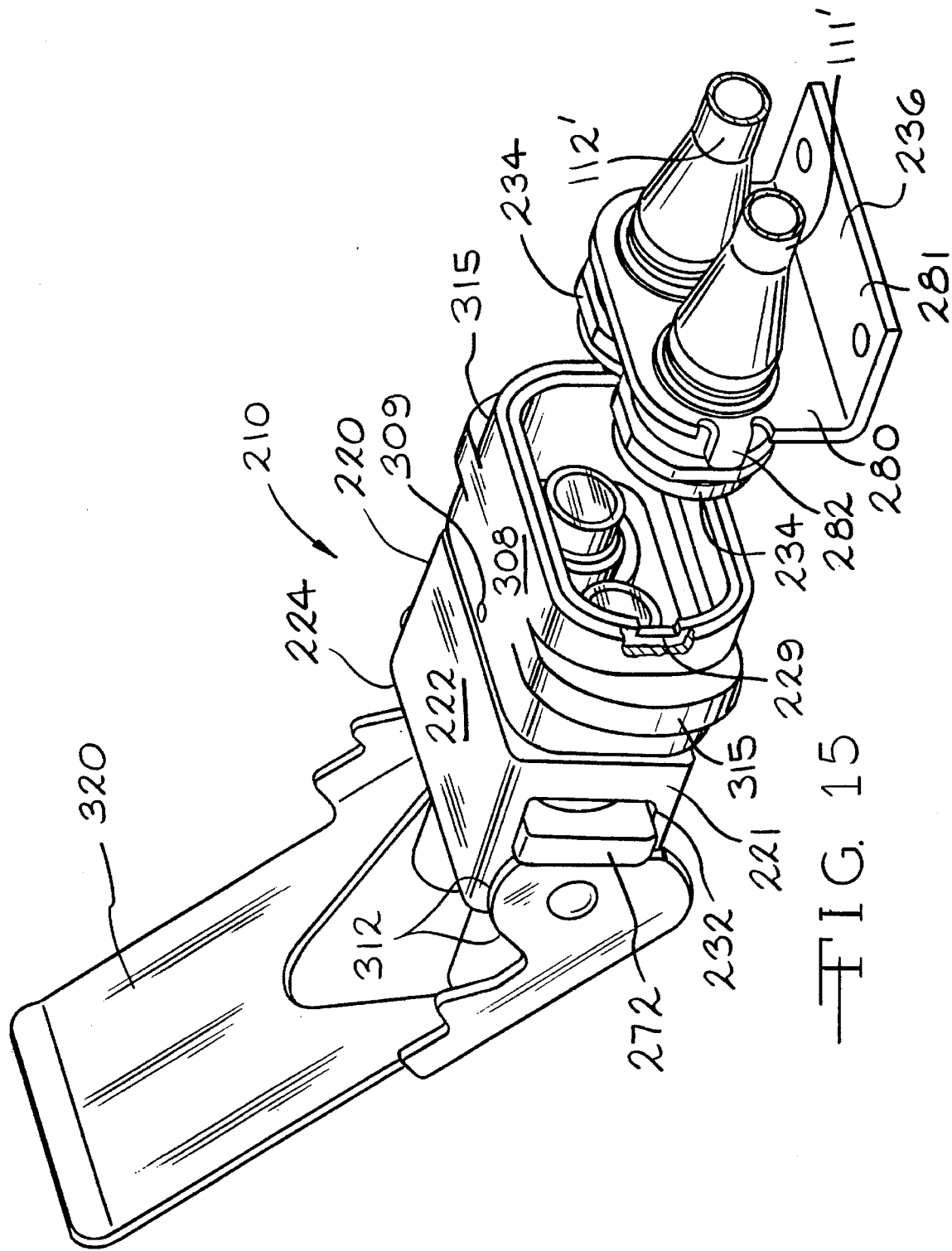
FIG. 15 is a perspective view of the modified coupling showing the adapters and bracket disengaged from the housing.

With reference to FIG. 14, two compression springs 212 are positioned in the housing 220, with one compression spring 212 positioned in each of the smaller passageway 228. One end of each of the compression springs 212 rests against the pin 309 and the other end of each compression spring 212 rests against the plate 270 thereby continuously urging the release sleeve 308 to a forward, latched position while simultaneously urging the plate 270 into contact with cams 312 of a handle assembly 320. The release sleeve 308 has an inwardly facing recesses 313 at the end opposite the end to which the pin 309 is joined. The outwardly facing grooves 248 of the adapters are aligned with slots 233 formed in each side wall 222 of the housing 220. A dowel pin 214 is positioned in each of the slots 233 and is moveable therein toward and away from the axis A. The diameter of the dowel pin 214 is less than the width of the slot 233 at the external side but greater than the width at the internal side so that dowel pin 214 will not fall out when the adapter 234 is removed. The release sleeve 308 is provided with outwardly extending flanges 315 to facilitate manual gripping and retraction of the sleeve 308. When the release sleeve 308 is moved to its retracted position, the inwardly facing recess 313 of the release sleeve 308 is aligned with each of the slots 233 thereby permitting each of the dowel pins 314 to move to its outermost position away from the axis A so that the innermost portion of the dowel pins 314 is aligned with or outwardly from the inner face of the housing side wall 222 thereby permitting the adapters 234 to be inserted into the housing 220. The diameter of the dowel pin 214 is greater than the thickness of the side wall 222. As a result, upon release of the sleeve 308 following engagement of the adapters 234 in the housing 220, the release sleeve 308 will move toward the adapters 234 in response to urging by the compression springs 212 against the pin 309 to thereby force the dowel pins 314 into engagement with the outwardly facing grooves 248 of the adapters 234 thereby locking the adapters 234 to the housing 220. When so engaged, the seal 294 bonded to the enlarged head 293 will be aligned with and slightly spaced from the flat face 262 of the stem valve 258 enlarged head 260. (See FIG. 12).

As can be readily appreciated, each of the valves carried by the respective female body members 235 and adapters 234 remains in a closed position when the adapters 234 are initially engaged to the housing 220 as shown in FIG. 12. Thus, each of the sleeves 250 is urged toward its associated stem valve enlarged head 260 by its respective compression spring 256 such that the neoprene seal 203 bonded to the leading end thereof becomes sealingly engaged to the outwardly extending flange 261 of such enlarged head. Similarly, the tapered wall 295 of the seals 294 mounted on the respective enlarged heads 293 are sealingly engaged to the adjacent tapered portions 285 of the adapters 234. Thus, the adapters 234 and the bracket 236 may be readily and easily engaged to the housing 220 even though there may be significant pressure in the fluid flow lines 111, 111', 112, 112' connected to either the female body members 235 or the adapters 234.

Following engagement of the adapters 234 to the housing 220, the coupling 210 is now ready for opening the respective stem valves 258 contained in the female body members 235 and stem valves 290 in the adapters. Such opening is accomplished by means of the handle assembly 320 which is similar to that of handle assembly 220 described in the previous embodiment. Rotation of the handle 320 causes the cam 312 to urge the plate 270 toward the leading end 239 thereby moving the female body members 235 into sealing engagement with the adapters 234 in two areas, the first being the seals 203 of the sleeves 250 engaging the abutment 287. Continued movement of the body members 235 causes (1) the sleeves 250 to be retracted in the passageway 243 and disengaged from the enlarged head 260 to open valve stem 258 and causes the valve stem 258 to displace and open the stem valve 290 of the aligned adapter 234 and (2) the aligned metal portion of the female body members 235 to sealingly engage the seals 289.

Many other modifications will be readily apparent to those skilled in the art. Accordingly, the scope of the present invention should be limited only by the scope of the claims appended hereto.

I claim:

1. A coupling for joining together opposing ends of a pair of refrigerant flow lines comprising:
   (a) a housing extending in an axial direction generally parallel to the joined flow lines from a first axial end to a second axial end, a web extending laterally across said housing, said web having first and second passageways aligned with said flow lines;
   (b) a pair of first valve assemblies, one positioned in each of said first and second passageways, each of said first valve assemblies including,
      (i) a body member slideably positioned in one of said first and second passageways for movement from a retracted position to a forward position closer to said housing first axial end, said body member having (1) a central passageway extending from an attachment end communicating with a refrigerant fluid flow line in the vicinity of said housing second axial end to a forward end, said central passageway having an internal cylindrical wall surface extending to said forward end and (2) an exterior sealing surface adjacent said central passageway forward end;
      (ii) a sleeve having a first portion positioned in said body member forward end in contact with and axially slideable relative to said internal cylindrical wall surface and a second portion extending out of said body member, said second portion including an exterior cylindrical surface and an inwardly facing sealing surface tapering outwardly;
      (iii) a stem valve positioned in said central passageway and extending from a rear end to a forward end having a face, said stem valve having a head with an outwardly facing sealing surface tapered for sealing engagement with said sleeve sealing surface, said stem valve mounted on said body member for movement therewith from said retracted position to said forward position; and
      (iv) a spring within said central passageway yieldingly urging said sleeve away from said attachment end and into sealing engagement with said stem valve outwardly facing sealing surface; and
   (c) a second valve assembly releasingly engageable with said housing at said first end, said second valve assembly including
      (i) a support member having an inner end positioned within said housing when engaged thereto, a pair of flow passages axially aligned with said central passageways, said support member having, for each flow passage, an inwardly facing sealing surface adjacent said inner end positioned to be engaged by said body member exterior sealing surface when said body member is in said forward position, an annular shoulder positioned to be engaged by said sleeve second portion when said body member is in said forward position, an annular elastomeric sealing ring between said inwardly facing sealing surface and said shoulder, said elastomeric sealing ring sized to sealingly engage said sleeve exterior cylindrical surface; and
      (ii) a pair of valves mounted on said second valve assembly, with one valve in each of said flow passages and aligned with one of said stem valves, said valves being yieldingly moveable from a closed position to an open position upon engagement by and movement of said stem valve to said forward position; and
   (d) means for causing said body members and their stem valves to move axially, said support member annular shoulders stopping axial movement of said sleeves while permitting movement of said body members and stem valves to thereby open said stem valves and said aligned pair of valves of said second valve assembly, each of said sleeve exterior surfaces sealingly engaging each of said annular elastomeric sealing rings and thereafter each of said body member exterior sealing surfaces engaging each of said support member inwardly facing sealing surfaces in metal-to-metal sealing relationship.

2. The coupling of claim 1, wherein each of said support members inwardly facing sealing surfaces adjacent said inner end are tapered inwardly toward said axis in a direction away from said inner end and each of said body member exterior sealing surfaces follows a curved path in the area of engagement of said inwardly facing sealing surface of said support member.

3. A coupling for joining together opposing ends of a pair of refrigerant flow lines comprising:
   (a) a housing extending in an axial direction generally parallel to the joined flow lines from a first axial end to a second axial end, a web extending laterally across said housing, said web having first and second passageways aligned with said flow lines;
   (b) a pair of first valve assemblies, one positioned in each of said first and second passageways, each of said first valve assemblies including,
      (i) a body member slideably positioned in one of said first and second passageways for movement from a retracted position to a forward position closer to said housing first axial end, said body member having (1) a central passageway extending from an attachment end communicating with a refrigerant fluid flow line in the vicinity of said housing second axial end to a forward end, said central passageway having an internal cylindrical wall surface extending to said forward end and (2) an exterior sealing surface adjacent said central passageway forward end;
      (ii) a sleeve having a first portion positioned in said body member forward end in contact with and axially slideable relative to said internal cylindrical wall surface and a second portion extending out of said body member, said second portion including an exterior cylindrical surface and an inwardly facing sealing surface tapering outwardly;
      (iii) a stem valve positioned in said central passageway and extending from a rear end to a forward end having a face, said stem valve having a head with an outwardly facing sealing surface tapered for sealing engagement with said sleeve sealing surface, said stem valve mounted on said body member for movement therewith from said retracted position to said forward position; and (iv) a spring within said central passageway yieldingly urging said sleeve away from said attachment end and into sealing engagement with said stem valve outwardly facing sealing surface; and (c) a second valve assembly releasingly engageable with said housing at said first end, said second valve assembly including (i) a support member having an inner end positioned within said housing when engaged thereto, a pair of flow passages each of which is axially aligned with one of said central passageways, said support member having, for each flow passage, an inwardly facing sealing surface adjacent said inner end positioned to be engaged by said body member exterior sealing surface when said body member is in said forward position, an annular shoulder positioned to be engaged by said sleeve second portion when said body member is in said forward position, an annular elastomeric sealing ring between said inwardly facing sealing surface and said shoulder, said elastomeric sealing ring sized to sealingly engage said sleeve exterior cylindrical surface; and (ii) a pair of valves mounted on said second valve assembly, with one valve in each of said flow passages and aligned with one of said stem valves, said valves being yieldingly moveable from a closed position to an open position upon engagement by and movement of said stem valve to said forward position; and (d) a rigid plate mounted laterally on said housing for reciprocating movement in an axial direction, said body members engaged to said plate for movement therewith, movement of said plate toward said housing first end causing said body members and their stem valves to move axially while axial movement of said sleeve is prevented by said support member annular shoulder thereby opening said stem valves and said aligned pair of valves of said second valve assembly, each of said sleeve exterior surfaces sealingly engaging each of said annular elastomeric sealing rings and thereafter each of said body member exterior sealing surfaces engaging each of said support member inwardly facing sealing surfaces in metal-to-metal sealing relationship.

4. The coupling of claim 3, wherein each of said support members inwardly facing sealing surfaces adjacent said inner end are tapered inwardly toward said axis in a direction away from said inner end and each of said body member exterior sealing surfaces follows a curved path in the area of sealing engagement of said support member.

5. The coupling of claim 3, wherein said housing has third and fourth passageways parallel to said first and second passageways and a compression spring is positioned in each of said third and fourth passageways of said housing, said compression springs yieldingly urging said plate away from said housing first end.

6. The coupling of claim 5 further including a release sleeve encircling said housing, a pin extending laterally through said housing positioned in axially extending slots of said housing and engaged to opposing portions of said release sleeve, said pin aligned with and engaged by said compression springs to urge said release sleeve to a first locking position toward said housing first end and moveable in said slots against the yielding force of said compression springs to permit retraction of said release sleeve to a second release position.

7. A coupling of claim 3 further including resiliently compressible members between said body members and said plate.

8. The coupling of claim 3 further including spring washers between said body members and said plate.

9. The coupling of claim 6 further including cams mounted on said housing and engaged to said plate, movement of said cams to a first position, urging said plate toward said housing first end and movement of said cams to a second position permitting movement of said plate away from said first end.

10. The coupling of claim 9, wherein said cams are mounted for rotation about a pivot point and have arms associated therewith, each of said arms extending to an end spaced from said cams, at least one of said arms having a shoulder engageable with said release sleeve when said cam is in said first position to prevent retraction of said release sleeve.

11. A coupling for joining together opposing ends of a pressurized flow line comprising:

(a) a housing extending along an axis from an open first end to a second end, a connector adjacent said first end for releaseably connecting a structure in said open first end;

(b) a first valve extending from an outbound end engaged to one of said flow line ends to an inbound end positionable in said housing first end and having, (i) an engagement abutment engageable with said housing connector;

(ii) a passageway extending along said axis and defined in part by an inwardly tapering surface in the area of said inbound end;

(iii) a sealing surface adjacent said inbound end;

(iv) a shoulder positioned inwardly toward said axis from sealing surface; and (v) a valve head yieldingly moveable along said axis from a closed position engaged to said inwardly tapering surface when in a first axial position to an open position when moved toward said outbound end; and (c) a second valve positioned in said housing, said second valve including, (i) a body member slideably positioned in said housing for movement from a retracted position to a forward position closer to said housing open first end, said body member having a central passageway extending from an attachment end communicating with the other of said flow line ends to a forward end, said central passageway having an internal cylindrical wall surface extending to said forward end;

(ii) a sleeve positioned in said body member forward end and having an exterior cylindrical surface in contact with and axially slideable relative to said internal cylindrical wall surface, said sleeve having a forward end extendable out of said body member and a trailing end;

(iii) a stem valve positioned in said central passageway and extending through said sleeve from a rear end to a forward end, said stem valve having a head with an outwardly extending surface sized for sealing engagement with said sleeve in the area of said forward end, said stem valve mounted on said body member for movement therewith from said retracted position to said forward position; and (iv) a spring within said central passageway yieldingly urging said sleeve away from said attachment end and into sealing engagement with said stem valve outwardly extending surface; and (d) a rigid plate mounted laterally on said housing for reciprocating movement in an axial direction, movement of said plate toward said housing first end causing said body member and its stem valve to move axially while axial movement of said sleeve is prevented by said first valve shoulder thereby opening said stem valve and said aligned valve head of said first valve.

12. The coupling of claim 11, wherein said body member has an exterior sealing surface following a curved path and positioned to engage said sealing surface of said first valve.

13. The coupling of claim 11, wherein compression spring means are positioned to yieldingly urge said plate away from said housing first end.

14. The coupling of claim 13 further including a release sleeve encircling said housing, a pin extending laterally through said housing positioned in axially extending slots of said housing and engaged to opposing portions of said release sleeve, said pin aligned with and engaged by said compression spring means to urge said release sleeve to a first locking position toward said housing first end and moveable in said slots against the yielding force of said compression spring means to permit retraction of said release sleeve to a second release position.

15. A coupling of claim 11 further including resiliently compressible members between said body members and said plate.

16. The coupling of claim 11 further including spring washers between said body members and said plate.

17. The coupling of claim 14 further including cams mounted on said housing and engaged to said plate, movement of said cams to a first position, urging said plate toward said housing first end and movement of said cams to a second position permitting movement of said plate away from said first end.

18. The coupling of claim 17, wherein said cams are mounted for rotation about a pivot point and have arms associated therewith, each of said arms extending to an end spaced from said cams, at least one of said arms having a shoulder engageable with said release sleeve when said cam is in said first position to prevent retraction of said release sleeve.

19. A coupling for joining together a first valve assembly engaged to one end of a pressurized flow line and a second valve assembly engaged to an opposing end of a said flow line, (a) said first valve assembly including
  (i) an outer structure extending from a first end joined to said flow line one end to a second end and defining (1) a flow passage extending between said first and second ends along an axis, (2) an inwardly facing tapered sealing surface adjacent said second end, (3) a first shoulder spaced from and axially inwardly from said tapered sealing surface, (4) a resilient annular seal between said tapered sealing surface and said shoulder and (5) a second shoulder tapering outward away from said axis in a direction toward said first end; and
  (ii) a valve mounted on said outer structure within said flow passage, said valve being yieldingly movable axially from a forward position sealingly engaged to said second shoulder to a rear, open position, said coupling comprising;

(b) a housing extending from an open first end for releaseably receiving said first valve assembly to a second end;

(c) said second valve assembly including
  (i) a body member slideably positioned in said housing for movement from a retracted position to a forward position closer to said housing open first end, said body member having (1) a central passageway extending from an attachment end joined to said opposing end of said flow line to a forward end, said central passageway having an internal cylindrical wall surface extending to said forward end and (2) an exterior sealing surface adjacent said central passageway forward end sized to engage, when in said forward position, said inwardly faced tapered sealing surface of said first valve assembly;
  (ii) a sleeve having a first portion positioned in said body member forward end in contact with and axially slideable relative to said internal cylindrical wall surface and a second portion extending out of said body member, said second portion including an exterior cylindrical surface, said sleeve second portion sized to engage said first shoulder of said first valve assembly;
  (iii) a stem valve positioned in said central passageway and extending from a rear end to a forward end having a face, said stem valve having a head with an outwardly facing annular seal for sealing engagement with said sleeve, said stem valve mounted on said body member for movement therewith from said retracted position to said forward position; and
  (iv) a spring within said central passageway yieldingly urging said sleeve away from said attachment end and into sealing engagement with said stem valve annular seal; and (d) a rigid plate mounted laterally on said housing for reciprocating movement in an axial direction, movement of said plate toward said housing first end causing said body member and its stem valves to move axially while axial movement of said sleeve is prevented by said first valve assembly first shoulder thereby opening said stem valve and said aligned valve of said first valve assembly, said sleeve exterior surface sealingly engaging said resilient annular seal and thereafter each of said body member exterior sealing surface engaging said inwardly facing tapered sealing surface of said first valve outer structure.

20. A coupling for joining together opposing ends of a pair of fluid flow lines in which at least one of said ends is maintained under pressure at the time of joining comprising:

(a) a housing extending in an axial direction generally parallel to the joined flow lines from a first axial end to a second axial end, a web extending laterally across said housing, said web having first and second passageways aligned with said flow lines;

(b) a pair of first valve assemblies, one positioned in each of said first and second passageways, each of said first valve assemblies including,
  (i) a body member slideably positioned in one of said first and second passageways for movement from a retracted position to a forward position closer to said housing first axial end, said body member having a central passageway extending from an attachment end communicating with a fluid flow line in the vicinity of said housing second axial end to a forward end, said central passageway having an internal cylindrical wall surface extending to said forward end;
  (ii) a sleeve positioned in said body member forward end and having an exterior cylindrical surface in contact with and axially slideable relative to said internal cylindrical wall surface, said sleeve having a forward end extendable out of said body member and a trailing end;

(iii) a stem valve positioned in said central passageway and extending through said sleeve from a rear end to a forward end, said stem valve having a head with an outwardly extending surface sized for sealing engagement with said sleeve in the area of said forward end, said stem valve mounted on said body member for movement therewith from said retracted position to said forward position; and (iv) a spring within said central passageway yieldingly urging said sleeve away from said attachment end and into sealing engagement with said stem valve outwardly extending surface; and (c) a second valve assembly releasingly engageable with said housing at said first end, said second valve assembly including (i) a support member; and (ii) a pair of valves mounted on said support member, with one valve of said pair in each of said flow passages and aligned with one of said stem valves, said valves being yieldingly moveable from a closed position to an open position upon engagement by and movement of said stem valve to said forward position; and (d) a rigid plate mounted laterally on said housing for reciprocating movement in an axial direction, said body members engaged to said plate for movement therewith, movement of said plate toward said housing first end causing said body members and their stem valves to move axially while axial movement of said sleeve is prevented by said second valve assembly thereby opening said stem valves and said aligned pair of valves of said second valve assembly, each of said sleeves in the area of said forward end sealingly engaging said second valve assembly and thereafter each of said body members sealingly engaging said second valve assembly.

21. The coupling of claim 20, wherein said support member and said housing are provided with mating alignment means to insure correct ones of said opposing ends are joined together.

22. The coupling of claim 20, wherein said housing has third and fourth passageways parallel to said first and second passageways and a compression spring is positioned in each of said third and fourth passageways of said housing, said compression springs yieldingly urging said plate away from said housing first end.

23. The coupling of claim 22 further including a release sleeve encircling said housing, a pin extending laterally through said housing positioned in axially extending slots of said housing and engaged to opposing portions of said release sleeve, said pin aligned with and engaged by said compression springs to urge said release sleeve to a first locking position toward said housing first end and moveable in said slots against the yielding force of said compression springs to permit retraction of said release sleeve to a second release position.

24. A coupling of claim 20 further including resiliently compressible members between said body members and said plate.

25. The coupling of claim 20 further including spring washers between said body members and said plate.

26. The coupling of claim 23 further including cams mounted on said housing and engaged to said plate, movement of said cams to a first position, urging said plate toward said housing first end and movement of said cams to a second position permitting movement of said plate away from said first end.

27. The coupling of claim 26, wherein said cams are mounted for rotation about a pivot point and have arms associated therewith, each of said arms extending to an end spaced from said cams, at least one of said arms having a shoulder engageable with said release sleeve when said cam is in said first position to prevent retraction of said release sleeve.

28. A coupling for joining together opposing ends of a fluid flow line in which at least one of said ends is maintained under pressure at the time of joining comprising:

(a) a housing extending in an axial direction generally parallel to the joined flow line from a first axial end to a second axial end, said housing having a passageway aligned with said flow line;

(b) a valve assembly position in said passageway, said valve assembly including, (i) a body member slideably positioned in said housing passageway for movement from a retracted position to a forward position closer to said housing first axial end, said body member having (1) a central passageway extending from an attachment end communicating with a fluid flow line in the vicinity of said housing second axial end to a forward end, said central passageway having an internal cylindrical wall surface extending to said forward end and (2) an exterior sealing surface adjacent said central passageway forward end;

(ii) a sleeve having a first portion positioned in said body member forward end in contact with and axially slideable relative to said internal cylindrical wall surface and a second portion extending out of said body member, said second portion including an exterior cylindrical surface and an inwardly facing sealing surface tapering outwardly in a direction away from said body member;

(iii) a stem valve positioned in said central passageway and extending from a rear end to a forward end having a leading face, said stem valve having a head with an outwardly facing sealing surface tapered for sealing engagement with said sleeve sealing surface, said stem valve mounted on said body member for movement therewith from said retracted position to said forward position; and (iv) a spring within said central passageway yieldingly urging said sleeve away from said attachment end and into sealing engagement with said stem valve outwardly facing sealing surface; and (c) a second valve assembly releasingly engageable with said housing at said first end, said second valve assembly including (i) a support member having an inner end positioned within said housing when engaged thereto, a flow passage axially aligned with said central passageway, said support member having an inwardly facing sealing surface adjacent said inner end positioned to be engaged by said body member exterior sealing surface when said body member is in said forward position, an annular shoulder positioned to be engaged by said sleeve second portion when said body member is in said forward position, an annular elastomeric sealing ring axially positioned between said inwardly facing sealing surface and said shoulder, said elastomeric sealing ring sized to sealingly engage said sleeve exterior cylindrical surface; and (ii) an axially extending valve mounted on said second valve assembly in said flow passage and aligned with said stem valve, said axially extending valve being yieldingly moveable from a closed position to an open position upon engagement by and movement of said stem valve to said forward position; and (d) a rigid plate mounted laterally on said housing for reciprocating movement in an axial direction, said body member engaged to said plate for movement therewith, movement of said plate toward said housing first end causing said body member and its stem valve to move axially while axial movement of said sleeve is prevented by said support member annular shoulder thereby opening said stem valve and said aligned axially extending valve of said second valve assembly, said sleeve exterior surface sealingly engaging said annular elastomeric sealing ring and thereafter said body member exterior sealing surface engaging said support member inwardly facing sealing surface in metal-to-metal sealing relationship.

29. The coupling of claim 28, wherein said support member inwardly facing sealing surface adjacent said inner end are tapered inwardly toward said axis in a direction away from said inner end and said body member exterior sealing surface follows a curved path in the area of sealing engagement of said support member.

30. The coupling of claim 28 further including a compression spring yieldingly urging said plate away from said housing first end.

31. The coupling of claim 30 further including a release sleeve encircling said housing, a pin extending laterally through said housing positioned in axially extending slots of said housing and engaged to opposing portions of said release sleeve, said pin aligned with and engaged by said compression springs to urge said release sleeve to a first locking position toward said housing first end and moveable in said slots against the yielding force of said compression springs to permit retraction of said release sleeve to a second release position.

32. The coupling of claim 28 further including resiliently compressible members between said body members and said plate.

33. The coupling of claim 28 further including spring washers between said body members and said plate.

34. The coupling of claim 31 further including cams mounted on said housing and engaged to said plate, movement of said cams to a first position, urging said plate toward said housing first end and movement of said cams to a second position permitting movement of said plate away from said first end.

35. The coupling of claim 34, wherein said cams are mounted for rotation about a pivot point and have arms associated therewith, each of said arms extending to an end spaced from said cams, at least one of said arms having a shoulder engageable with said release sleeve when said cam is in said first position to prevent retraction of said release sleeve.

36. A coupling for joining together opposing ends of a pair of fluid flow lines comprising:

(a) a housing extending in an axial direction from a first axial end to a second axial end, a web extending laterally across said housing, said web having first and second passageways aligned with said flow lines;

(b) a pair of first valve assemblies, one positioned in each of said first and second passageways, each of said first valve assemblies including, (i) a body member slideably positioned in one of said first and second passageways for movement from a retracted position to a forward position closer to said housing first axial end, said body member having a central passageway extending from an attachment end communicating with a fluid flow line in the vicinity of said housing second axial end to a forward end, said central passageway having an internal cylindrical wall surface extending to said forward end;

(ii) a sleeve positioned in said body member forward end in contact with and axially slideable relative to said internal cylindrical wall surface from a retracted position to a forward position and having a rearward end and a leading end, said leading end extending out of said body member when said sleeve is in said forward position;

(iii) a stem valve positioned in said central passageway and extending from a rear end to a forward end having an enlarged head and terminating in a face, said head being sealingly engageable with said sleeve, said stem valve mounted on said body member for movement relative thereto from said retracted position to said forward position; and (iv) a spring within said central passageway yieldingly urging said sleeve away from said attachment end and into sealing engagement with said stem valve enlarged head; and (c) a pair of second valves releasingly engageable with said housing at said first end, each of said second valves aligned with one of said stem valves, said second valves being yieldingly moveable from a closed position to an open position upon engagement by and movement of the aligned one of said stem valves to said forward position, each of said second valves having a shoulder positioned to be engaged by said sleeve leading end when said body member is in said forward position; and (d) means for causing said body members and their stem valves to move axially, said shoulders stopping axial movement of said sleeves while permitting movement of said body members and stem valves to thereby open said stem valves and said aligned pair of second valves.

37. The coupling according to claim 36 further including a rigid plate mounted laterally on said housing for reciprocating movement in an axial direction, said body members engaged to said plate for movement therewith, movement of said plate toward said housing first end causing said body members and their stem valves to move axially.

38. The coupling of claim 37, wherein said housing has third and fourth passageways parallel to said first and second passageways and a compression spring is positioned in each of said third and fourth passageways of said housing, said compression springs yieldingly urging said plate away from said housing first end.

39. The coupling of claim 38 further including a release sleeve encircling said housing, a pin extending laterally through said housing positioned in axially extending slots of said housing and engaged to opposing portions of said release sleeve, said pin aligned with and engaged by said compression springs to urge said release sleeve to a first locking position toward said housing first end and moveable in said slots against the yielding force of said compression springs to permit retraction of said release sleeve to a second release position.

40. A coupling of claim 37 further including resiliently compressible members between said body members and said plate.

41. The coupling of claim 37 further including spring washers between said body members and said plate.

42. The coupling of claim 39 further including cams mounted on said housing and engaged to said plate, movement of said cams to a first position, urging said plate toward said housing first end and movement of said cams to a second position permitting movement of said plate away from said first end.

43. The coupling of claim 42, wherein said cams are mounted for rotation about a pivot point and have arms associated therewith, each of said arms extending to an end spaced from said cams, at least one of said arms having a shoulder engageable with said release sleeve when said cam is in said first position to prevent retraction of said release sleeve.

44. A coupling for joining together opposing ends of a fluid flow line comprising:
   (a) a housing extending along an axis from a first end to a second end;
   (b) a first valve received in said first end and mounted for axial movement relative to said housing, said first valve including a stem valve having an enlarged head, an annular sleeve encircling said stem valve and moveable relative thereto from a closed position engaged to said enlarged head to an open position spaced from said enlarged head and a spring yieldingly urging said sleeve toward said closed position, said first valve engaged to one of said opposing ends;
   (c) a second valve releaseably received in said second end, said second valve including a body having outwardly facing engagement means and a passage communicating with the other of said opposing ends, said passage having an annular sealing abutment, a valve stem with an enlarged sealing head yieldingly urgable from a closed position engaged to said sealing abutment to an open position spaced from said sealing abutment;
   (d) a release sleeve engaged to said housing for axial movement relative thereto, from a retracted position permitting the engagement and disengagement of said second valve with said housing to an extended position for retaining said second valve engaged to said housing;
   (d) spring means acting to both
      (i) urge said release sleeve toward said housing second end; and
      (ii) urge said first valve toward said housing first end; and
   (e) a cam actuatable following engagement of said second valve to said housing to urge said first valve toward said housing second end and into engagement with said second valve, said annular sleeve abutting said second valve while continued movement of said first valve toward said second valve moves said enlarged head to an open position while causing said second valve enlarged sealing head to move to said open position.

45. The coupling according to claim 44, wherein said housing is provided with a first set of apertures in the vicinity of said first end and a second set of apertures in the vicinity of said second end and further including (a) a plate supported on said housing and extending through said first set of apertures, said plate supporting said first valve (b) a support member mounted on said release sleeve and extending through said second set of apertures, said spring means acting against said plate and said support member to yieldingly urge said release sleeve away from said plate.

46. The coupling according to claim 45, wherein said housing includes a web disposed laterally of said axis, said web including a first passageway and a second passageway, said first valve extending through said first passageway and said spring means extending through said second passageway.

* * * * *